(12) United States Patent
Whitby-Strevens

(10) Patent No.: US 7,457,302 B1
(45) Date of Patent: Nov. 25, 2008

(54) ENHANCEMENT TO LOOP HEALING FOR MALCONFIGURED BUS PREVENTION

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 1108 days.

(21) Appl. No.: 10/335,974

(22) Filed: Dec. 31, 2002

(51) Int. Cl.
*H04L 12/56* (2006.01)

(52) U.S. Cl. ................................ 370/404; 370/468

(58) Field of Classification Search ............. 370/216, 370/276, 404, 229, 235, 462, 468, 231, 228; 709/227, 206, 225; 710/104, 107; 707/104, 707/203; 718/104; 726/26
See application file for complete search history.

(56) References Cited

U.S. PATENT DOCUMENTS

| | | | | |
|---|---|---|---|---|
| 4,156,798 A | 5/1979 | Doelz | ..................... | 179/15 AL |
| 4,194,113 A | 3/1980 | Fulks et al. | .................... | 371/20 |
| 5,014,262 A | 5/1991 | Harshavardhar | ............. | 370/16 |
| 5,253,248 A * | 10/1993 | Dravida et al. | .............. | 370/228 |
| 5,274,631 A | 12/1993 | Bhardwaj | .................... | 370/60 |
| 5,343,461 A | 8/1994 | Barton et al. | ................. | 370/13 |
| 5,394,556 A | 2/1995 | Oprescu | ..................... | 395/800 |
| 5,452,330 A | 9/1995 | Goldstein | ................... | 375/257 |
| 5,490,253 A | 2/1996 | Laha et al. | .................. | 395/304 |
| 5,495,481 A | 2/1996 | Duckwall | ................... | 370/85.2 |
| 5,539,390 A | 7/1996 | Nagano et al. | ......... | 340/825.07 |
| 5,541,670 A | 7/1996 | Hanai | ........................ | 348/705 |
| 5,568,641 A | 10/1996 | Nelson et al. | ................ | 395/700 |
| 5,583,922 A | 12/1996 | Davis et al. | .................... | 379/96 |
| 5,621,659 A | 4/1997 | Matsumoto et al. | ..... | 364/514 R |
| 5,630,173 A | 5/1997 | Oprescu | ..................... | 395/860 |
| 5,640,595 A | 6/1997 | Baugher et al. | ............. | 395/830 |
| 5,684,715 A | 11/1997 | Palmer | .................... | 365/514 C |
| 5,701,476 A | 12/1997 | Fenger | ....................... | 395/652 |
| 5,701,492 A | 12/1997 | Wadsworth et al. | ......... | 395/712 |
| 5,712,834 A | 1/1998 | Nagano et al. | ................ | 369/19 |
| 5,719,862 A | 2/1998 | Lee et al. | ..................... | 370/355 |
| 5,784,648 A | 7/1998 | Duckwall | ................... | 395/860 |
| 5,802,048 A | 9/1998 | Duckwall | ................... | 370/389 |
| 5,802,057 A | 9/1998 | Duckwall et al. | ........... | 370/408 |
| 5,805,073 A | 9/1998 | Nagano et al. | ......... | 340/825.07 |

(Continued)

OTHER PUBLICATIONS

Loop prevention for IEEE1394-1995 and IEEE1394a-2000 networks Yago, H.; Takano, T.; Tokura, N.; Consumer Electronics, IEEE Transactions on vol. 48, Issue 1, Feb. 2002 pp. 135-142.*

(Continued)

*Primary Examiner*—Thong H Vu
(74) *Attorney, Agent, or Firm*—Gazdzinski & Associates

(57) ABSTRACT

A method for safely adding nodes to a network provides safeguards to prevent adding nodes beyond a maximum number of nodes allowed in the network. In one aspect, if the node to be added exceeds the maximum number of nodes allowed, the connection between the node to be added and the network is quarantined. If the node to be added does not exceed the maximum number of nodes allowed, the connection is confirmed. In another aspect, an additional test is made to determine if the connection between the network and the node to be added creates a loop within the network. In the case of a detected loop, the connection between the network and the node to be added is quarantined. If the connection does not create a loop, it is confirmed.

30 Claims, 24 Drawing Sheets

U.S. PATENT DOCUMENTS

| | | | |
|---|---|---|---|
| 5,809,331 A | 9/1998 | Staats et al. | 395/830 |
| 5,832,298 A | 11/1998 | Sanchez et al. | 395/828 |
| 5,832,497 A * | 11/1998 | Taylor | 707/104.1 |
| 5,835,761 A | 11/1998 | Ishii et al. | 395/653 |
| 5,867,730 A | 2/1999 | Leyda | 395/830 |
| 5,875,301 A | 2/1999 | Duckwall et al. | 395/200.51 |
| 5,938,764 A | 8/1999 | Klein | 713/1 |
| 5,963,731 A * | 10/1999 | Sagawa et al. | 703/6 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 6,032,202 A | 2/2000 | Lea et al. | 710/8 |
| 6,038,625 A | 3/2000 | Ogino et al. | 710/104 |
| 6,070,171 A * | 5/2000 | Snyder et al. | 707/203 |
| 6,070,187 A | 5/2000 | Subramaniam et al. | 709/220 |
| 6,073,206 A | 6/2000 | Piwonka et al. | 711/102 |
| 6,122,248 A | 9/2000 | Murakoshi et al. | 370/216 |
| 6,131,129 A | 10/2000 | Ludtke et al. | 710/5 |
| 6,131,134 A | 10/2000 | Huang et al. | 710/103 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,157,972 A | 12/2000 | Newman et al. | 710/100 |
| 6,160,796 A | 12/2000 | Zou | 370/257 |
| 6,167,532 A | 12/2000 | Wisecup | 713/300 |
| 6,173,327 B1 | 1/2001 | De Borst et al. | 709/231 |
| 6,182,022 B1 * | 1/2001 | Mayle et al. | 702/182 |
| 6,182,109 B1 * | 1/2001 | Sharma et al. | 718/104 |
| 6,192,189 B1 | 2/2001 | Fujinami et al. | 386/96 |
| 6,202,210 B1 | 3/2001 | Ludtke | 725/20 |
| 6,233,615 B1 | 5/2001 | Van Loo | 709/224 |
| 6,233,624 B1 | 5/2001 | Hyder et al. | 709/327 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,260,063 B1 | 7/2001 | Ludtke et al. | 709/224 |
| 6,266,334 B1 | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,282,597 B1 | 8/2001 | Kawamura | 710/105 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/301 |
| 6,330,249 B1 * | 12/2001 | Matsuno et al. | 370/462 |
| 6,345,315 B1 | 2/2002 | Mishra | 709/329 |
| 6,353,868 B1 | 3/2002 | Takayama et al. | 710/129 |
| 6,363,085 B1 | 3/2002 | Samuels | 370/502 |
| 6,374,316 B1 * | 4/2002 | James et al. | 710/104 |
| 6,385,679 B1 | 5/2002 | Duckwall et al. | 710/119 |
| 6,553,013 B1 * | 4/2003 | Jones et al. | 370/328 |
| 6,587,904 B1 * | 7/2003 | Hauck et al. | 710/107 |
| 6,628,607 B1 * | 9/2003 | Hauck et al. | 370/216 |
| 6,657,954 B1 * | 12/2003 | Bird et al. | 370/229 |
| 6,707,792 B1 * | 3/2004 | Volftsun et al. | 370/235 |
| 6,757,247 B1 * | 6/2004 | Zheng et al. | 370/231 |
| 6,765,873 B1 * | 7/2004 | Fichou et al. | 370/235 |
| 6,810,452 B1 * | 10/2004 | James et al. | 710/104 |
| 6,977,887 B1 * | 12/2005 | Hauck et al. | 370/216 |
| 7,054,972 B2 * | 5/2006 | Parry et al. | 710/260 |
| 7,124,438 B2 * | 10/2006 | Judge et al. | 726/22 |
| 2002/0039349 A1 * | 4/2002 | Malaney et al. | 370/230.1 |
| 2002/0061012 A1 * | 5/2002 | Thi et al. | 370/352 |
| 2003/0023875 A1 * | 1/2003 | Hursey et al. | 713/201 |
| 2003/0048805 A1 * | 3/2003 | Yoshihara et al. | 370/468 |
| 2003/0084323 A1 * | 5/2003 | Gales | 713/200 |
| 2004/0064556 A1 * | 4/2004 | Zhang et al. | 709/225 |
| 2005/0031110 A1 * | 2/2005 | Haimovich et al. | 379/202.01 |
| 2006/0015563 A1 * | 1/2006 | Judge et al. | 709/206 |
| 2006/0053490 A1 * | 3/2006 | Herz et al. | 726/23 |
| 2006/0070129 A1 * | 3/2006 | Sobel et al. | 726/23 |
| 2007/0094741 A1 * | 4/2007 | Lynn et al. | 726/26 |

OTHER PUBLICATIONS

Wireless gateway for wireless home AV network and its implementation Saito, T.; Tomoda, I.; Takabatake, Y.; Teramoto, K.; Fujimoto, K.; Consumer Electronics, IEEE Transactions on vol. 47, Issue 3, Aug. 2001 pp. 496-501.*

"Information Technology-Microprocessor Systems-Control and Status Registers (CSR) Architecture for Microcomputer Buses", ANSI/IEEE Standard 1212, The Institute of Electrical and Electronics Engineers, Inc. pp. I-122, 1994 Edition.

"IEEE Standard for a High Performance Serial Bus", IEEE Standard 1394-1995, Institute of Electrical and Electronics Engineers, Inc., pp. 1-384, approved Jul. 22, 1996.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

* cited by examiner

ENHANCEMENT TO LOOP HEALING FOR MALCONFIGURED BUS PREVENTION

FIELD OF THE INVENTION

The present invention relates broadly to computer networks. Specifically, the present invention relates to configuring a bus connecting multiple computers in a network. More specifically, the present invention relates to quarantining a connection between nodes in a network if the connection is found to create a loop or the number of nodes in the network exceeds an allowable number.

BACKGROUND OF THE INVENTION

Directing attention to FIG. 1, the IEEE 1394a standard defines communication protocols between nodes 2 on a computer network 4. Nodes 2 can be personal computers, workstations, or other computing devices. Each node has a PHY 6, which facilitates communication between the nodes and other nodes in network 4. PHY 6 has a plurality of ports so that multiple connections can be made to node 2. Nodes 2 can be connected by cable 8, or other suitable communication medium, to implement computer network 4. It is one of the goals of the 1394a standard to implement a protocol that treats all communication media connecting nodes 2 collectively as bus 8. To achieve this objective, a tree identification process is executed on nodes 2.

The tree identification process is executed in a distributed manner among the nodes to configure network 4 in a tree structure among nodes 2. The tree identification process executed on each node establishes a hierarchy among nodes 2 such that each connection between two nodes 2 defines one node as the parent of the other node and the other node as the child of the first node. A node may thus be parent to zero or more children, and each node has at most one parent. On each node 2, a flag on each port in PHY 6 indicates the peer node as either a parent or a child. A root node 2-1 eventually is determined to be a node that has only children and no parent. By establishing a hierarchy among nodes 2, the communication protocols of the IEEE1394a standard are able to function properly. The root node 2-1 has particular responsibilities, such as acting as cycle master and issuing cycle start packets. This function is essential to isochronous operation, which, in turn, is essential to the use of the IEEE1394a standard in consumer digital audio-visual applications among others. When a node has identified all connections to its PHY 6 as being connections to children with the exception of one connection, it is assumed that the remaining, unidentified connection points to a potential parent node.

A problem occurs when a user incorrectly installs a node in network 4. For the tree identification process (and therefore network 4) to function properly there needs to be one less connection cable between nodes than the number of nodes present in network 4. However, as most devices that are compatible as nodes within network 4 are sold with an accompanying cable, quite often the user simply connects the new node using the cable as an addition to bus 8. This violates the requirement of bus 8 having one less connection cable than the number of nodes in network 4.

SUMMARY

The present invention method apparatus and computer program product for adding a node to a network in a manner that does not exceed the maximum number of nodes allowed on the network. In one aspect, the present invention determines whether adding a new node to an existing network of nodes would violate the maximum number of nodes allowed in the network. If the addition of the new node exceeds the maximum number allowed, the connecting port is quarantined. Quarantining a port on a node prevents an illegitimate connection while allowing the possibility of connecting the node in a proper manner that preserves acceptable operation of the network. In the alternative, if adding the node does not exceed the maximum node count, the connection is confirmed.

In an alternative embodiment, the present invention can be combined with loop testing to provide an additional test for making new connections to a network. In this embodiment, a first check is made to see if the new connection creates a network with nodes that exceed the maximum number allowed. If the addition of the new node does not exceed the maximum number of allowed nodes, a loop testing algorithm is performed to see if the new connection between the new node and the network creates a loop within the network. If either the node count exceeds the maximum allowed number, or the connection creates a loop, the connecting port is quarantined. If the node to be added does not exceed the maximum allowed number of nodes and the connection does not create a loop, the new connection is confirmed.

In another aspect of the invention, a method of configuring a network having a plurality of nodes connected by a bus is disclosed. In one embodiment, the method comprises: determining an existing number of member nodes on the network; determining whether the existing number of member nodes plus a candidate node is less than a maximum number of nodes allowed in the network; and quarantining a connection between the network and the candidate node if adding the candidate node to the network results in a number of nodes that exceeds the maximum number of nodes on the network.

In a further aspect of the invention, a computer readable medium is disclosed. In one embodiment, the medium comprise instructions, which, when executed by a processor, configure a network having a plurality of nodes connected by a bus, by: determining an existing number of member nodes on the network; determining whether the existing number of member nodes plus a candidate node is less than a maximum number of nodes allowed in the network, wherein the maximum number of nodes allowed in the network is determined at least in part by the number of links in the network; and quarantining a connection between the network and the candidate node if adding the candidate node to the network results in a number of nodes that exceeds the maximum number of nodes on the network.

In another aspect of the invention, a system of nodes connected by a bus is disclosed. In one embodiment, the system comprise functionality for: determining an existing number of member nodes on a network; determining whether the existing number of member nodes plus a candidate node is less than a maximum number of nodes allowed in the network, wherein the maximum number of nodes allowed in the network is determined at least in part by the number of links in a combined network comprising the network and the candidate node; and quarantining a connection between the network and the candidate node if adding the candidate node to the network results in a number of nodes that exceeds the maximum number of nodes on the network.

In still another aspect of the invention, a method is disclosed. In one embodiment, the method comprises: determining an existing number of member nodes on a network; comparing the existing number of member nodes plus a candidate node to the number of links that would exist in the network if the candidate node is added to the network; and quarantining at least one connection between the network and the candidate node if the existing number of member nodes plus a candidate node is less than or equal to the number of links that would exist in the network if the candidate node is added to the network.

In another embodiment, the method comprises: determining whether adding a candidate node to a network creates one or more loops in the network; and quarantining one or more connections between the network and the candidate node if it is determined that adding the candidate node to the network creates one or more loops.

In still another aspect of the invention, a method for use in a data network is disclosed. In one embodiment, the method comprises: determining a number of existing nodes associated with the network; evaluating the number of existing nodes plus a candidate node, and a number of links that would exist in the network if the candidate node is added to the network; and quarantining at least one connection between the network and the candidate node if the existing number of nodes plus a candidate node is less than or equal to the number of links.

In another aspect, network apparatus is disclosed. In one embodiment, the apparatus comprises: a first module adapted to determine whether adding a candidate node to a network creates one or more loops in the network; and a second module adapted to quarantine one or more connections between the network and the candidate node if it is determined that adding the candidate node to the network creates one or more loops.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to data communications. More particularly, the present invention relates to a method and apparatus for loop breaking on a serial bus. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Although the bus architecture described herein is described with reference to components for a single computer, the bus architecture has a broader scope. The bus architecture could include audio and video components, home appliances, positioning and robotic systems, and test and measurement systems, for example. The present invention may be applied to any arbitrarily assembled collection of nodes linked together as a network of devices. In addition, it is necessary to distinguish a node from a physical computer component. Each component to reside on a bus will have with it at least one node physical layer controller. A given component may be associated with multiple nodes. However, there will usually be a one-to-one correspondence between devices or components and nodes on a bus.

According to the IEEE1394-1995 standard, reconfiguration of a serial bus is required when either 1) a new node is joined to the serial bus, or 2) an identified node of the serial bus is removed from the serial bus. Reconfiguration is required to better ensure that all nodes of the serial bus are notified of the newly connected or disconnected node and that each node has a unique bus address. Typically, the node of the serial bus that detects a new connection or disconnection forces the three phase configuration to be performed by asserting a bus reset signal.

Figure 2:
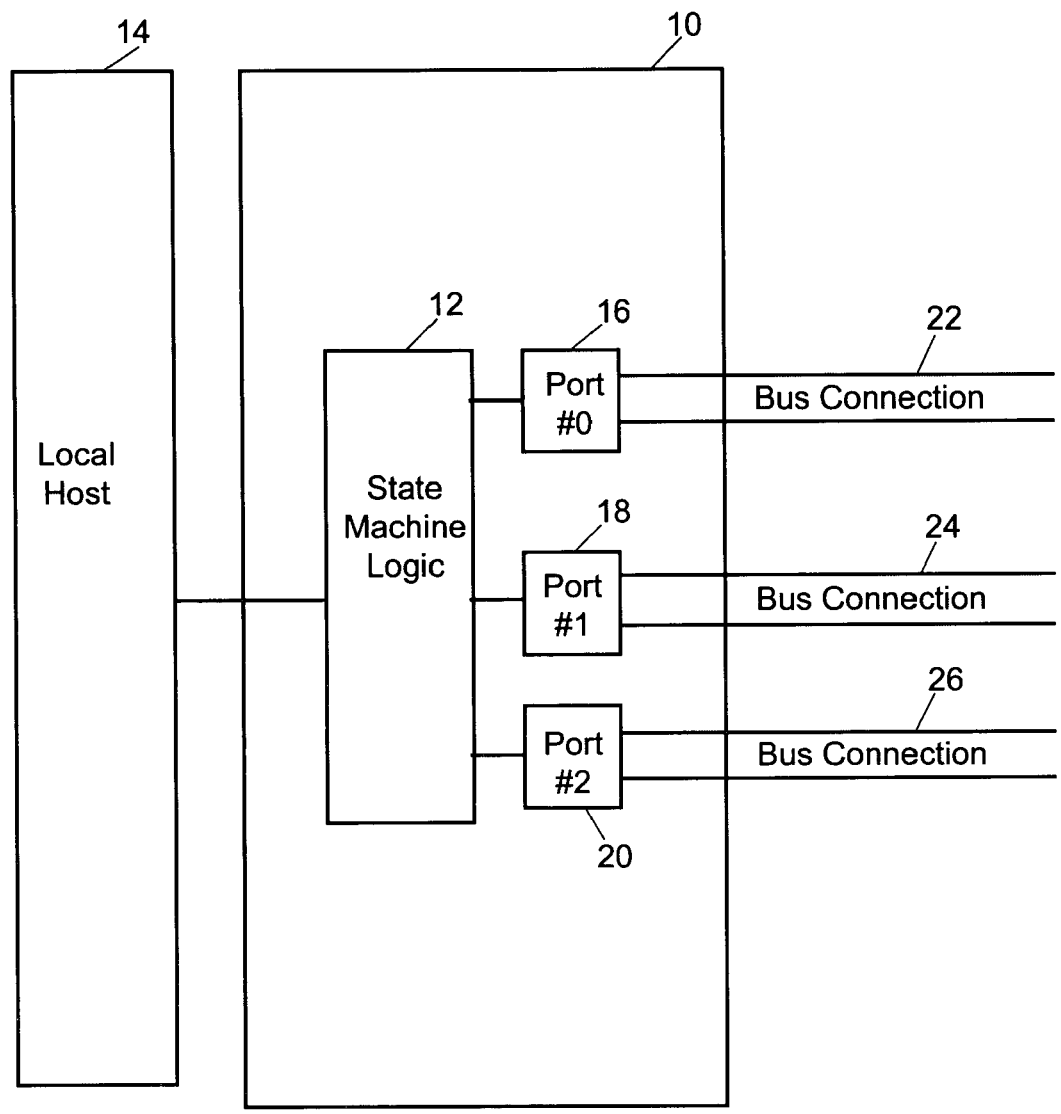
FIG. 2 is a block diagram that illustrates a node according to the present invention.

Referring now to FIG. 2, a block diagram of a node 10 is illustrated. In a preferred embodiment, the nodes are designed to be compatible with the IEEE1394a Serial Bus Standard. The node 10 includes state machine logic 12. This state machine logic 12 incorporates all the logic circuitry for carrying out the methodologies and algorithms to be described herein. The circuitry may comprise a programmable logical array (PLA) or be uniquely designed to carry out the functions described herein. Those of ordinary skill in the art, having the benefit of this disclosure, will be able to implement the present invention without undue experimentation. The node 10 is usually coupled to a local host 14.

The local host 14 may be any device one wishes to attach to the bus, such as a disk drive, CPU, keyboard, television, stereo, household appliance, or any other component which needs to communicate with other components in the system. The node 10, by means of its logic, will implement the arbitration protocol including the bus initialization, tree identification and self-identification described above and the loop detecting functions described in detail below.

The node 10 communicates with other nodes through communications links. A link is a connection between two ports. Typically, a cable segment is used for a link. However, a link may be implemented as any physical communication channel, including wireless RF or infrared. A port is the interface between a node and a link. A port has the ability to transmit and receive data. A port can also determine whether it is connected to another port through a link. In FIG. 2, node 10 has three external ports 16, 18 and 20 with connecting links 22, 24 and 26, respectively.

An individual node may have more than one port, and each node is able to transmit and receive data on any one of its ports. A node is also able to receive and transmit signaling messages through all of its ports. In the discussion that follows, devices and local hosts will, for the most part, be omitted and all references to bus topology will refer to nodes and node connections through various ports.

Figure 3A:
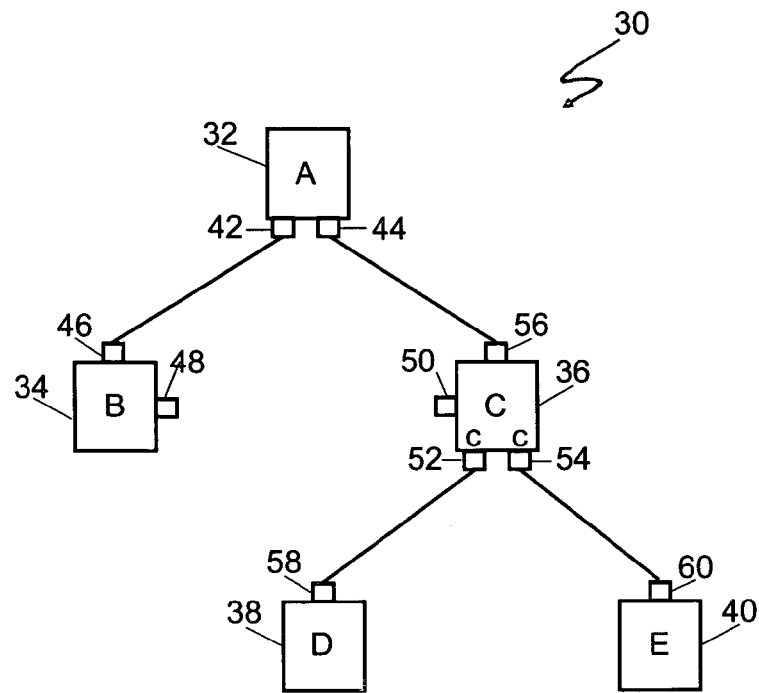
FIG. 3A is a block diagram that illustrates the tree identification process according to the IEEE1394a Serial Bus Standard.

Turning now to FIG. 3A, the tree identification process is illustrated. The tree 30 includes five nodes, labeled A 32, B 34, C 36, D 38 and E 40. Node A 32 has two ports 42 and 44. Node B 34 has two ports 46 and 48. Node C 36 has four ports 50, 52, 54 and 56. Node D 38 has one port 58 and Node E 40 has one port 60. Nodes B 34, D 38 and E 40 are leaf nodes because they have only one connected port. During tree identification, leaf nodes exchange signals with parent nodes to establish the parent-child relationship. Non-leaf nodes must wait until all connected ports but one are designated child ports. Accordingly, Node B 34 sends a "You are my parent" (YAMP) signal to node A 32. Node A 32 responds with a "You are my child" (YAMC) signal. The parent-child relationship between node D 38 and node C 36 and between node E 40 and node C 36 is established in the same way. For these purposes, an unconnected port, such as port 50 on node C 36 is regarded as a child port. At this point, all but one port 56 for node C 36 has been designated a child port (i.e. a connection to a child node). Since the other port 56 has not been assigned, it must be connected to a potential parent node. Node C 36 then establishes node A 32 as its parent and node A 32 establishes node C 36 as its child. Since all connected ports for node A 32 are connected to child nodes, node A 32 is the root node.

Those of ordinary skill in the art will recognize that node C 36 could have been designated the root node in the above example. Whether node A 32 or node C 36 is established as the root node depends upon the timing of the YAMP and YAMC signals. Node A 32 was designated the root node for illustrative purposes.

Figure 3B:
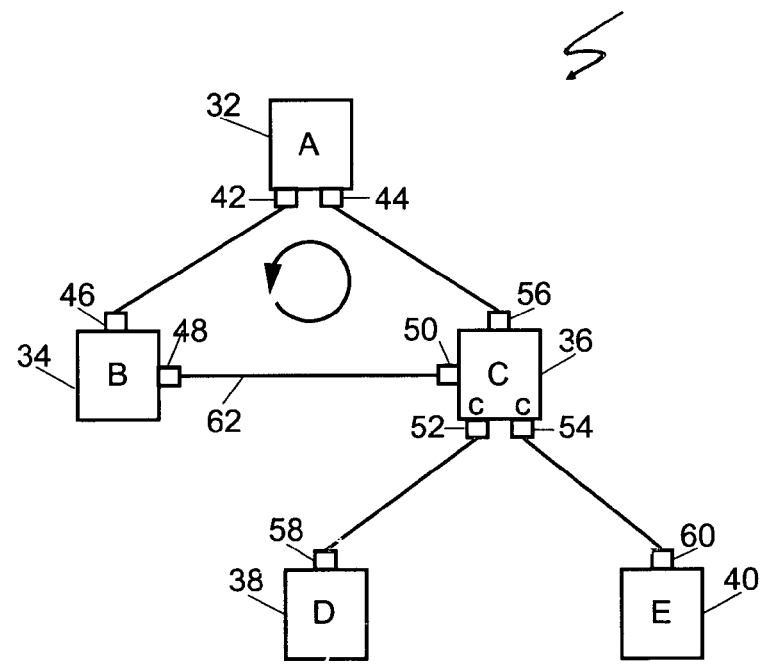
FIG. 3B is a block diagram that illustrates the tree identification process according to the IEEE1394a Serial Bus Standard in a configuration having a loop.

Turning now to FIG. 3B, the tree identification process is illustrated in a configuration having a loop. FIG. 3B is the same as FIG. 3A, except that port 48 of node B 34 has been connected via link 62 to port 50 of node C 36, creating a loop. Tree identification for leaf nodes D 38 and E 40 proceeds as explained with respect to FIG. 3A. The parent-child relationships between node D 38 and node C 36 and between node E 40 and node C 36 are established. At this point, the tree identification process cannot proceed because node A 32, node B 34 and node C 36 are non-leaf nodes with two unassigned ports. Eventually, the tree-ID process times out and the bus remains inoperable.

According to the present invention, all ports of a node are allowed to remain connected to their neighbors, even in the presence of one or more loops. The present invention minimizes the number of isolated links, thus avoiding breaking a bus into two or more isolated buses. A loop is broken by internally isolating selected ports from the whole of the node. In effect, each port of a loop functions as a leaf node. Thus, each port participates fully in bus reset, tree-ID and self-ID.

Figure 4A:
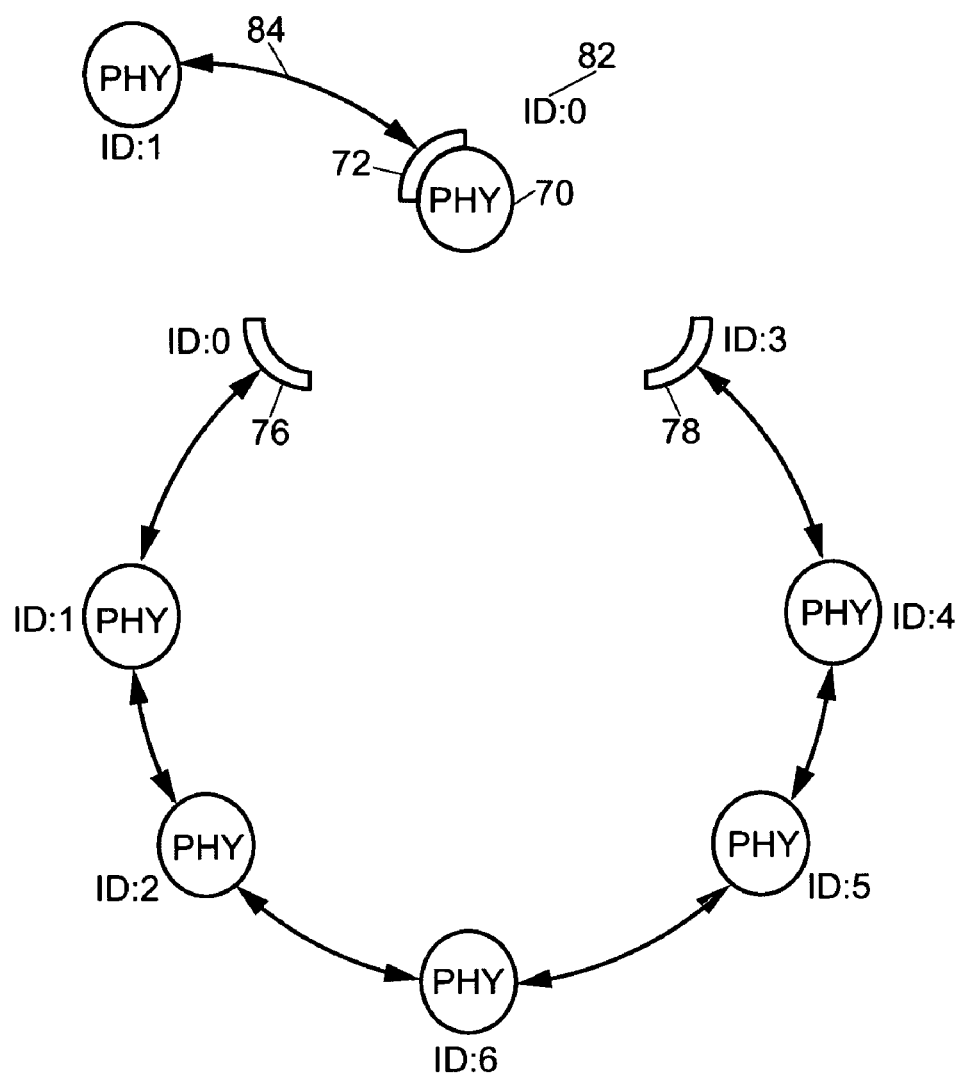
FIG. 4A is a block diagram that illustrates loop breaking in accordance with one embodiment of the present invention.

FIGS. 4A through 4E are block diagrams that illustrate loop breaking in a system comprising a bus compatible with the IEEE1394a standard in accordance with one embodiment of the present invention. In the discussion that follows, nodes will be referred to as PHYs in accordance with the IEEE1394a standard. In FIG. 4A, seven PHYs are represented. Initially, PHY 70 has at most one port 72 attached to its internal state machine. All other ports 76 and 78 are isolated from each other and the combined PHY 70 until they can be tested for loops. These ports appear as leaf nodes on the bus to which they are connected. While in this state, each port consumes a PHY_id on its attached bus.

Figure 4B:
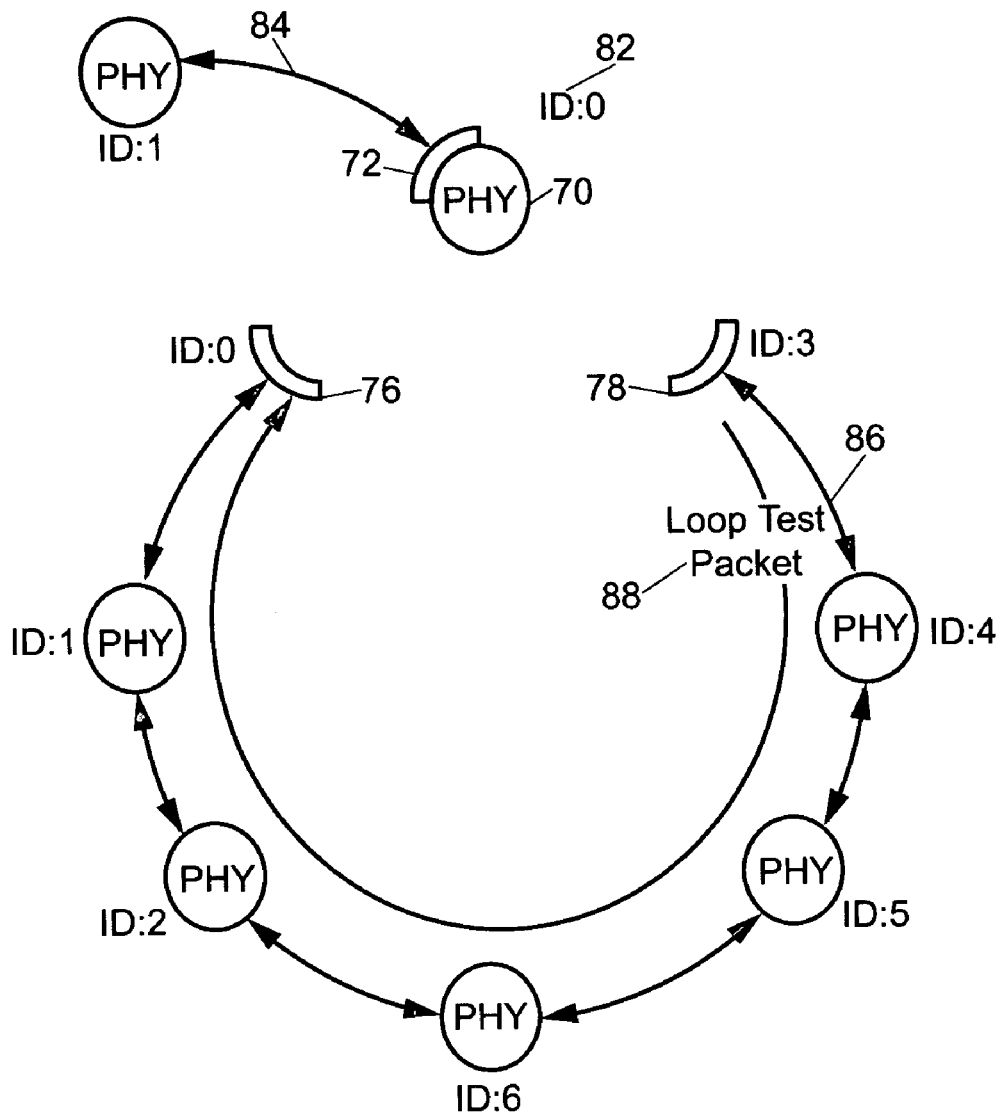
FIG. 4B is a block diagram that illustrates loop breaking in accordance with one embodiment of the present invention.
Figure 4C:
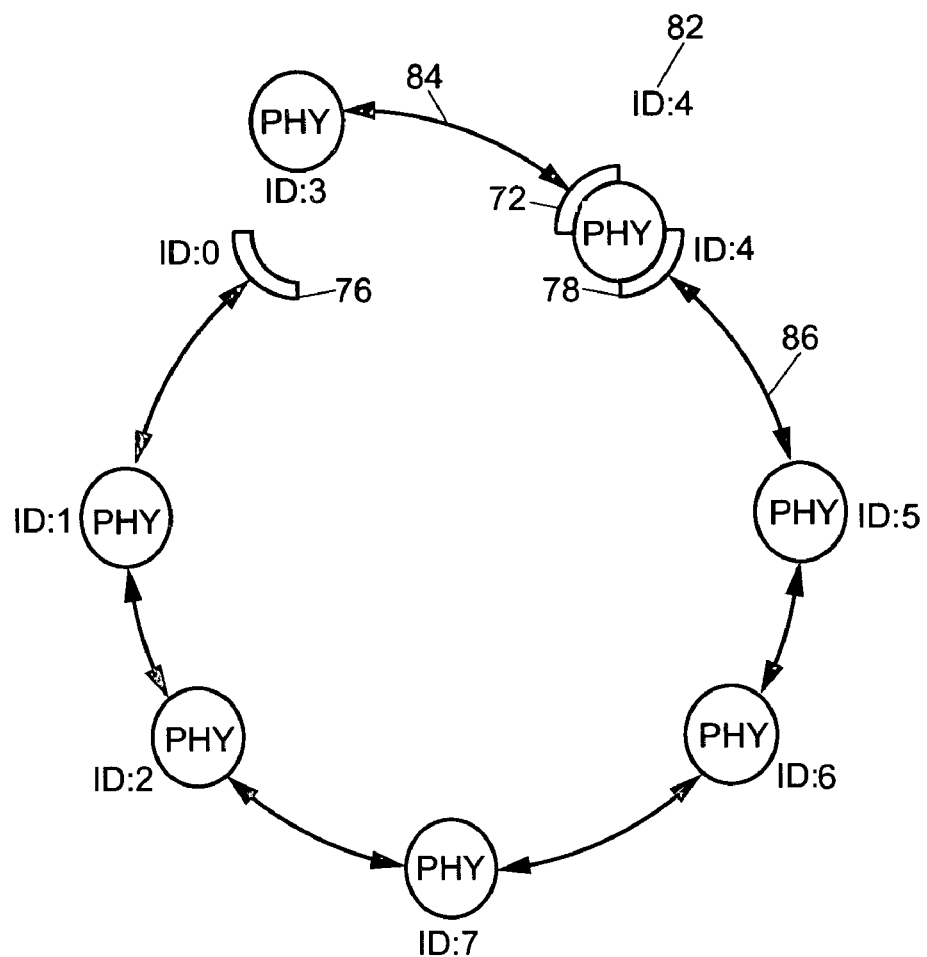
FIG. 4C is a block diagram that illustrates loop breaking in accordance with one embodiment of the present invention.

Turning now to FIG. 4B, a block diagram illustrating sending a loop test packet according to one embodiment of the present invention is presented. The main bus 84 is defined as the bus of which the tested and joined ports are members. The peer bus is defined as the bus of which the port under test is a member. The PHY 70 selects one of its untested ports 78, arbitrates for the attached peer bus 86, and begins transmitting a loop test packet (LTP) 88. If the UP 88 is not received on any other active port attached to the main bus within a period of time, the selected port 78 is free of loops and can be joined to the combined PHY 70. The port 78 may be joined by issuing a bus reset, which will cause a new tree identification process to be carried out, a root node identified and will assign new PHY_ids. The joining of the port 78 and the PHY 70 is represented in FIG. 4C. Note the newly assigned PHY_ids.

Figure 4D:
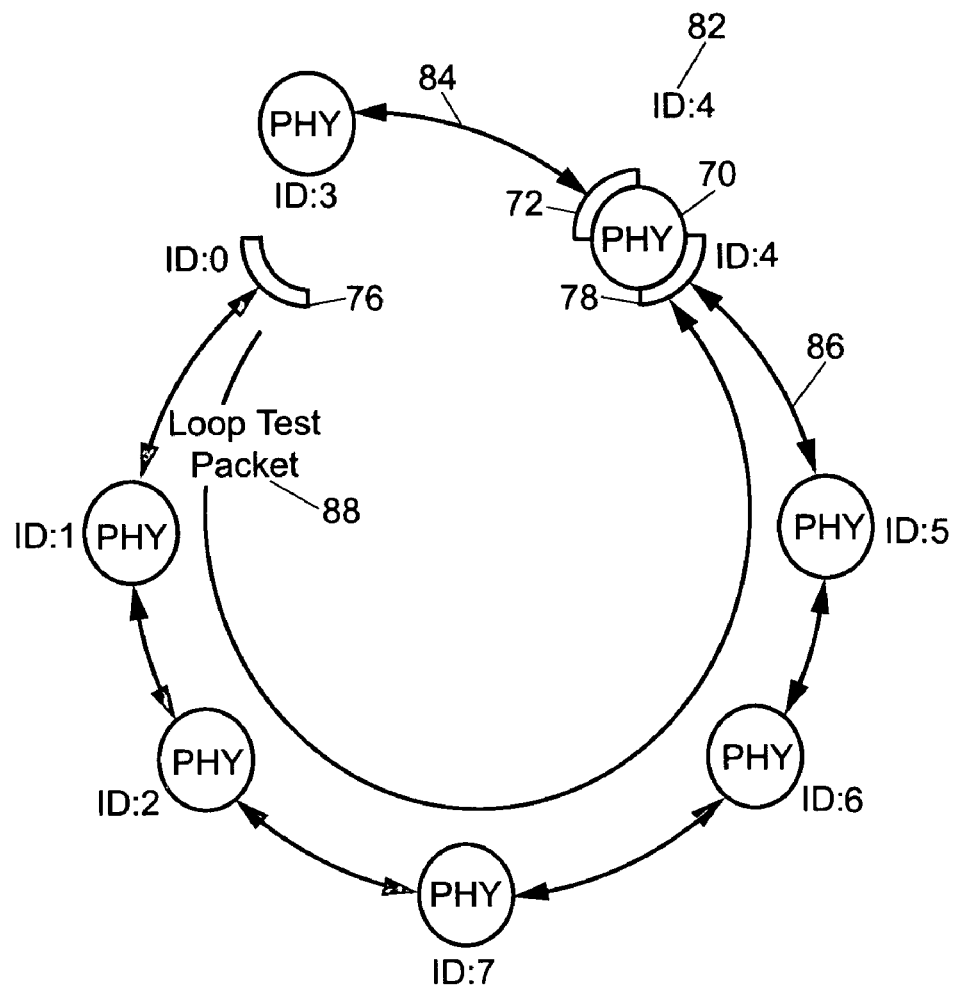
FIG. 4D is a block diagram that illustrates loop breaking in accordance with one embodiment of the present invention.
Figure 4E:
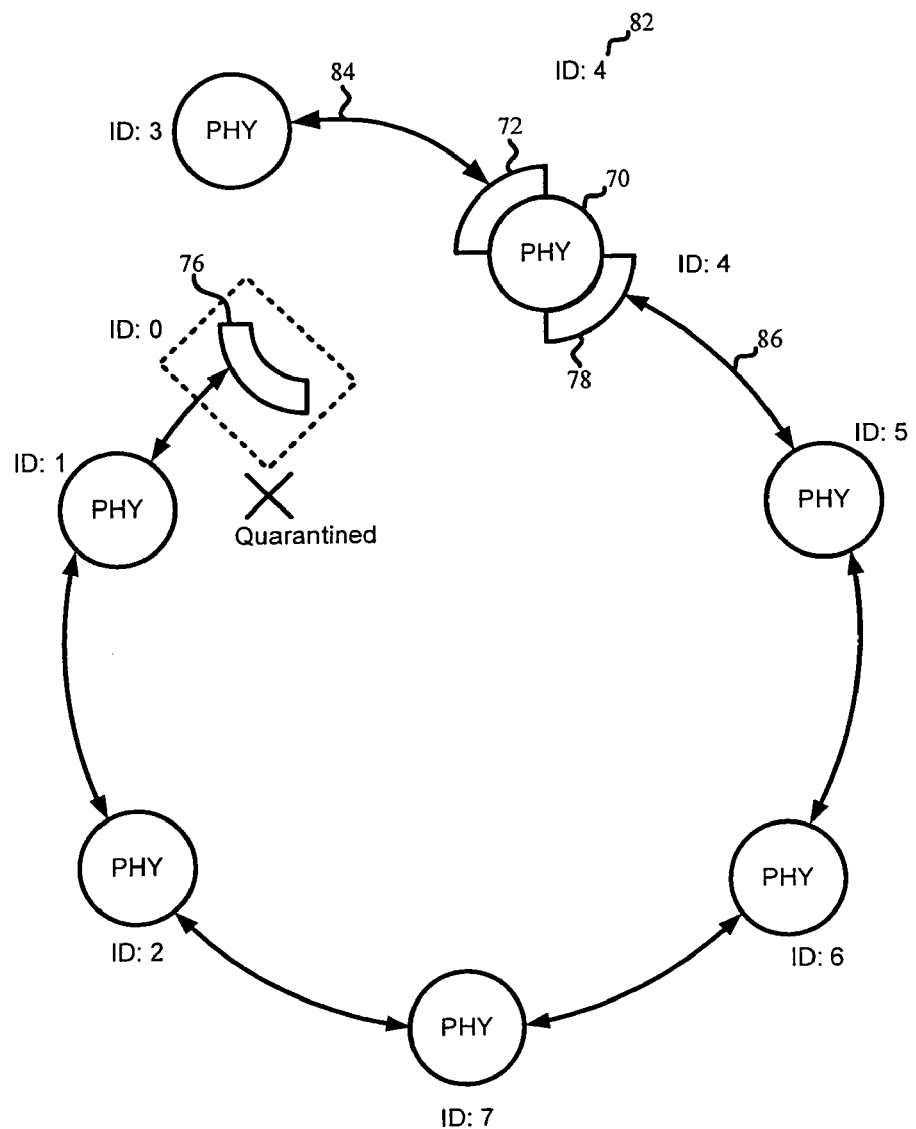
FIG. 4E is a block diagram that illustrates loop breaking in accordance with one embodiment of the present invention.

Turning now to FIG. 4D, a block diagram illustrating loop testing on a port having a loop is presented. After a join, the PHY 70 begins loop testing on the next untested port 76. If the LTP 88 is received on any other active port of the PHY 70, the port 76 is quarantined, as illustrated in FIG. 4E. However, cycle-free ports of the same PHY 70 remain connected to the combined PHY 70. Thus, port 72 remains connected to PHY 70. As referred to herein, when a port is quarantined, that port is deactivated and no data can pass through the port.

Figure 5:
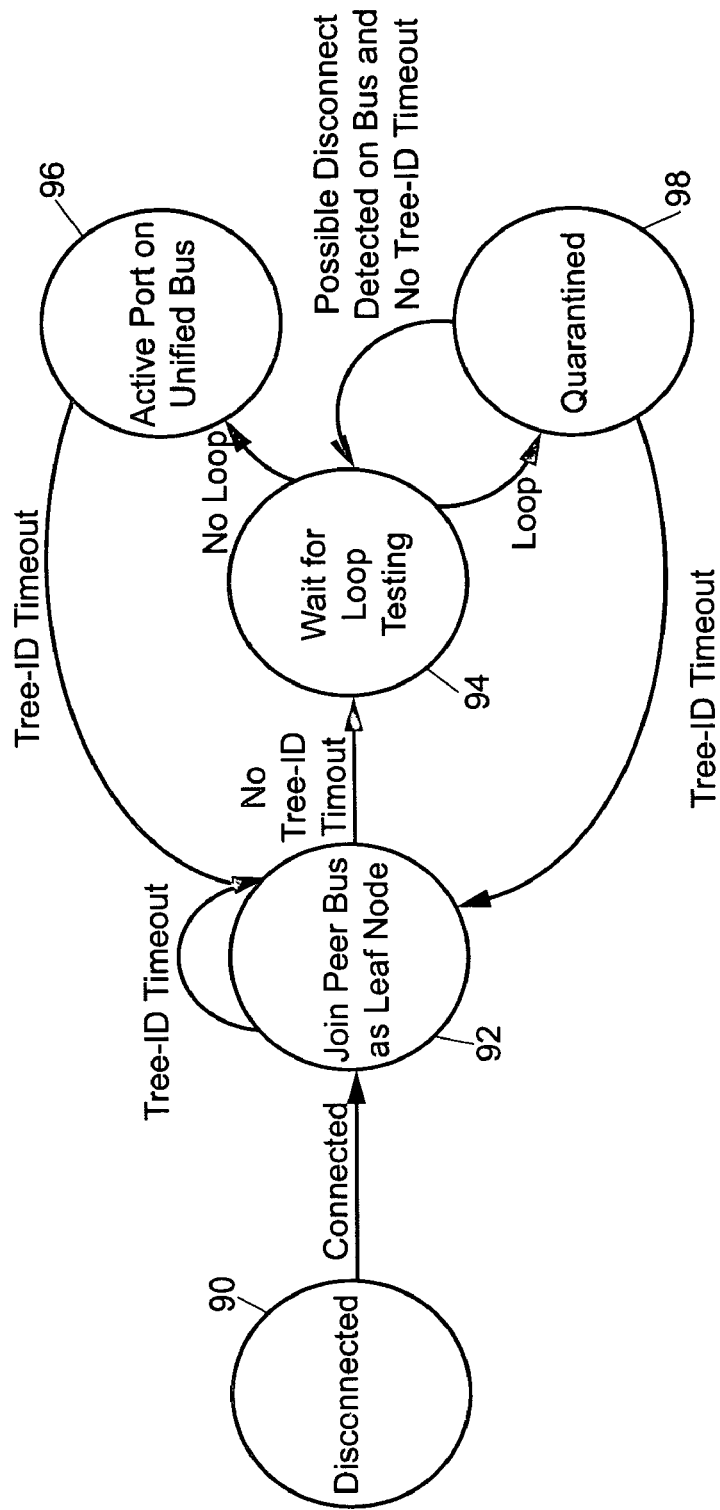
FIG. 5 is a state diagram that illustrates port actions in accordance with one embodiment of the present invention.

Turning now to FIG. 5, a state diagram illustrating port actions in accordance with one embodiment of the present invention is illustrated. Initially, an untested port is in a "Disconnected" state 90. When a connection is detected, a port attempts to join the peer bus, as represented by state 92. If the peer bus fails to complete tree-ID due to an external loop, the port remains unjoined, allowing the remaining joined ports to operate. After joining the peer bus as a leaf node, the port awaits loop testing service at state 94. If no loop is detected, the port joins the main bus at state 96 and remains active as long as no Tree-ID timeout is detected. If a loop is found, the port is quarantined at state 98 until a disconnect event happens. The disconnect event may have removed the loop.

Figure 6:
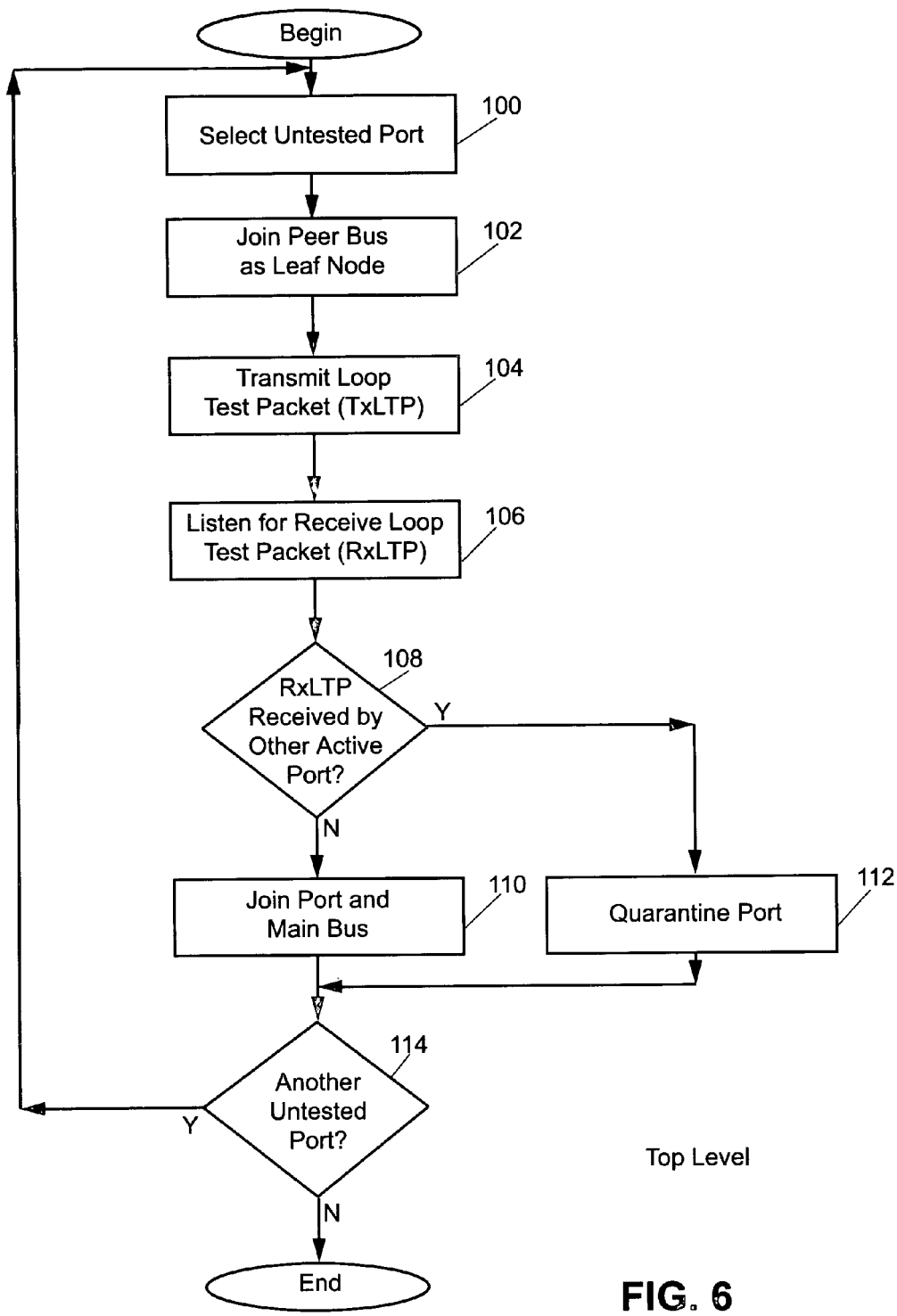
FIG. 6 is a flow diagram that illustrates port actions in accordance with one embodiment of the present invention.

Turning now to FIG. 6, a flow diagram illustrating port actions in accordance with one embodiment of the present invention is illustrated. This figure corresponds to the state diagram illustrated in FIG. 5. At reference numeral 100, an untested port is selected. At reference numeral 102, the port joins the peer bus as a leaf node. At reference numeral 104, the port arbitrates for the peer bus and transmits a loop test packet (TxLTP). At reference numeral 106, a second port listens for a receive loop test packet (RxLTP). The second port has been tested and is active. More than one port may be active at the same time. In this case, all active ports listen for the RxLTP. At reference numeral 108, a check is made to determine whether the RxLTP was received by the second port within a period of time. If the RxLTP was not received within the period of time, the port and the main bus are joined at reference numeral 110. If the RxLTP was received within the period of time, the first port is quarantined at reference numeral 112. At reference numeral 114, a check is made to determine whether other untested ports remain. If more untested ports remain, execution continues at reference numeral 100. This process continues until all ports have been tested for loops.

Figure 7:
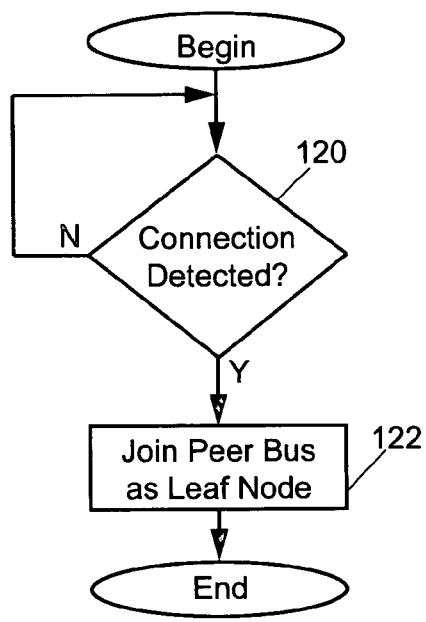
FIG. 7 is a flow diagram that illustrates the "Disconnected" state of a port in accordance with one embodiment of the present invention.

FIGS. 6-10 are flow diagrams that further illustrate these port actions. FIG. 7 illustrates the "Disconnected" state of a port in accordance with one embodiment of the present invention. A port is initially not connected to the peer bus. At reference numeral 120, a check is made to determine whether a new connection has been detected. When a new connection has been detected, the port joins the peer bus as a leaf node at reference numeral 122.

Figure 8:
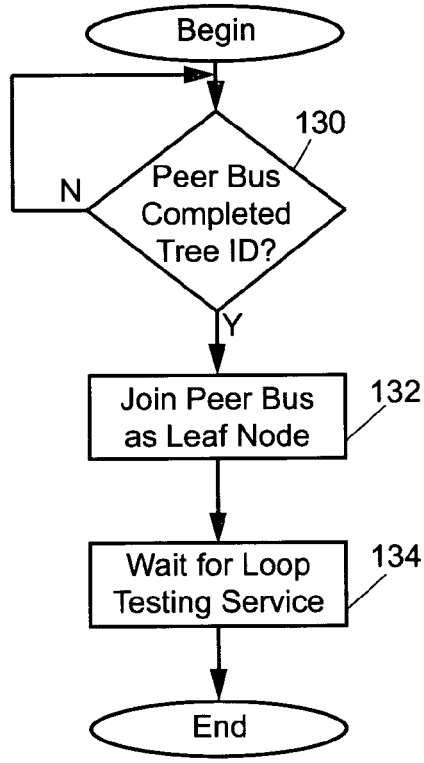
FIG. 8 is a flow diagram that illustrates the "Join peer bus as a leaf node" state of a port in accordance with one embodiment of the present invention.

FIG. 8 illustrates the "Join peer bus as a leaf node" state of a port in accordance with one embodiment of the present invention. At reference numeral 130, a check is made to determine whether the peer bus has completed tree-ID. When tree-ID has completed, an attempt is made to join the port to the peer bus as a leaf node by completing the Self-ID phase at reference numeral 132. After the port has been joined to the peer bus, the port waits for loop testing service at reference numeral 134.

Figure 9:
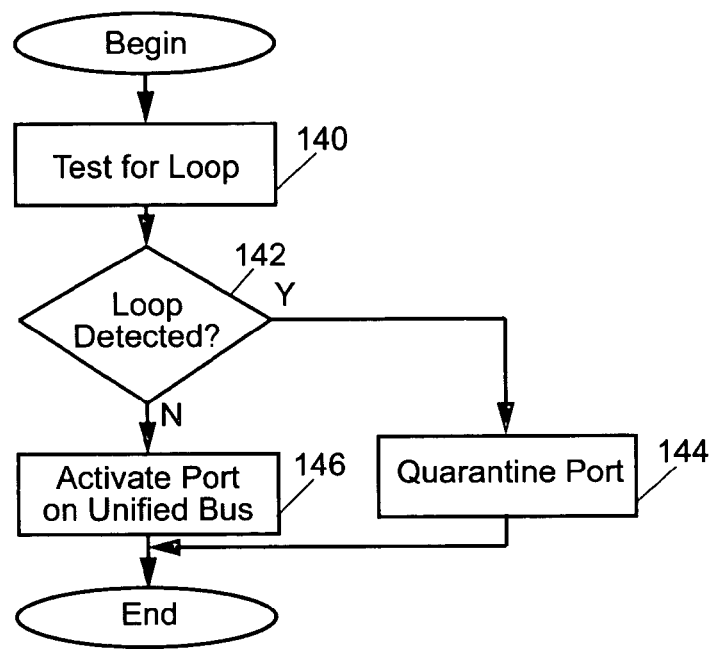
FIG. 9 is a flow diagram that illustrates the "Wait for loop testing" state of a port in accordance with one embodiment of the present invention.

FIG. 9 illustrates the "Wait for loop testing" state of a port in accordance with one embodiment of the present invention. At reference numeral 140, the port is tested for loops. At reference numeral 142, a check is made to determine whether a loop has been detected within a period of time. At reference numeral 144, the port is quarantined when a loop is detected. At reference numeral 146, the port is activated on a unified bus when a loop is not detected within the period of time.

Figure 10:
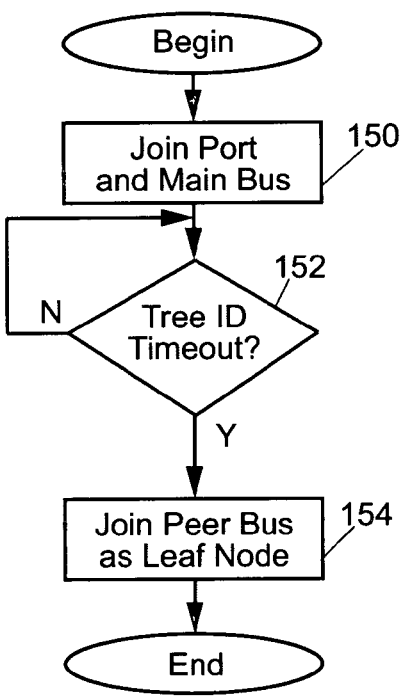
FIG. 10 is a flow diagram that illustrates the "Active port on unified bus" state in accordance with one embodiment of the present invention.

FIG. 10 illustrates the "Active port on unified bus" state in accordance with one embodiment of the present invention. At reference numeral 150, the port and the main bus are joined. At reference numeral 152, a check is made to determine whether a tree-ID timeout has been detected. If a tree-ID timeout has been detected, the port is no longer associated with the main bus and at reference numeral 154, the port is joined to the peer bus as a leaf node.

Figure 1:
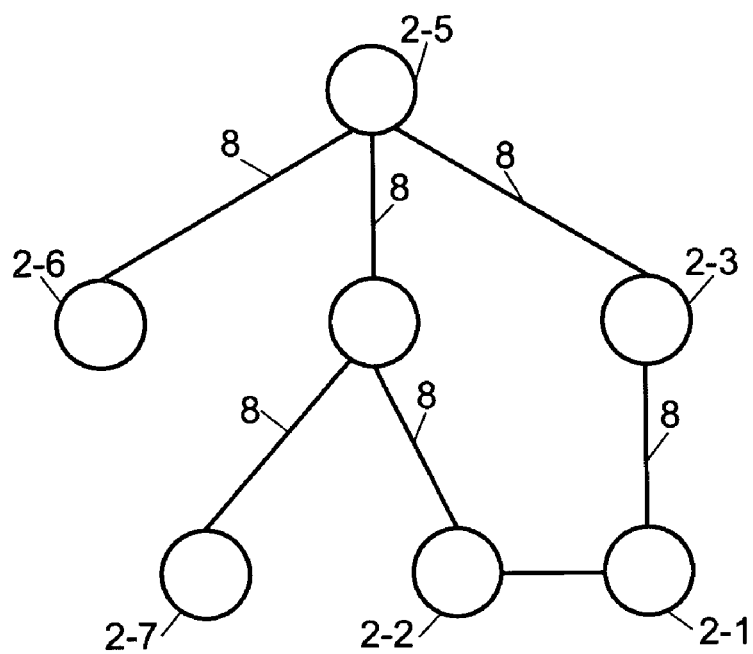
FIG. 1 is a diagram of a network of nodes that are improperly connected.

FIG. 1A illustrates the "Quarantined" state of a port in accordance with one embodiment of the present invention. At reference numeral 160, a check is made to determine whether a disconnect has been detected on the bus. A disconnect is signaled with a bus reset event. If a disconnect has not been detected, execution continues at reference numeral 160. If a disconnect has been detected, a check is made at reference numeral 161 to determine whether a Tree-ID timeout has occurred. At reference numeral 163, if a Tree-ID timeout has not occurred, the port enters the "wait for loop testing service" state described above. If a tree-ID timeout has occurred, the port is joined to the peer bus as a leaf node at reference numeral 164.

Figure 11A:
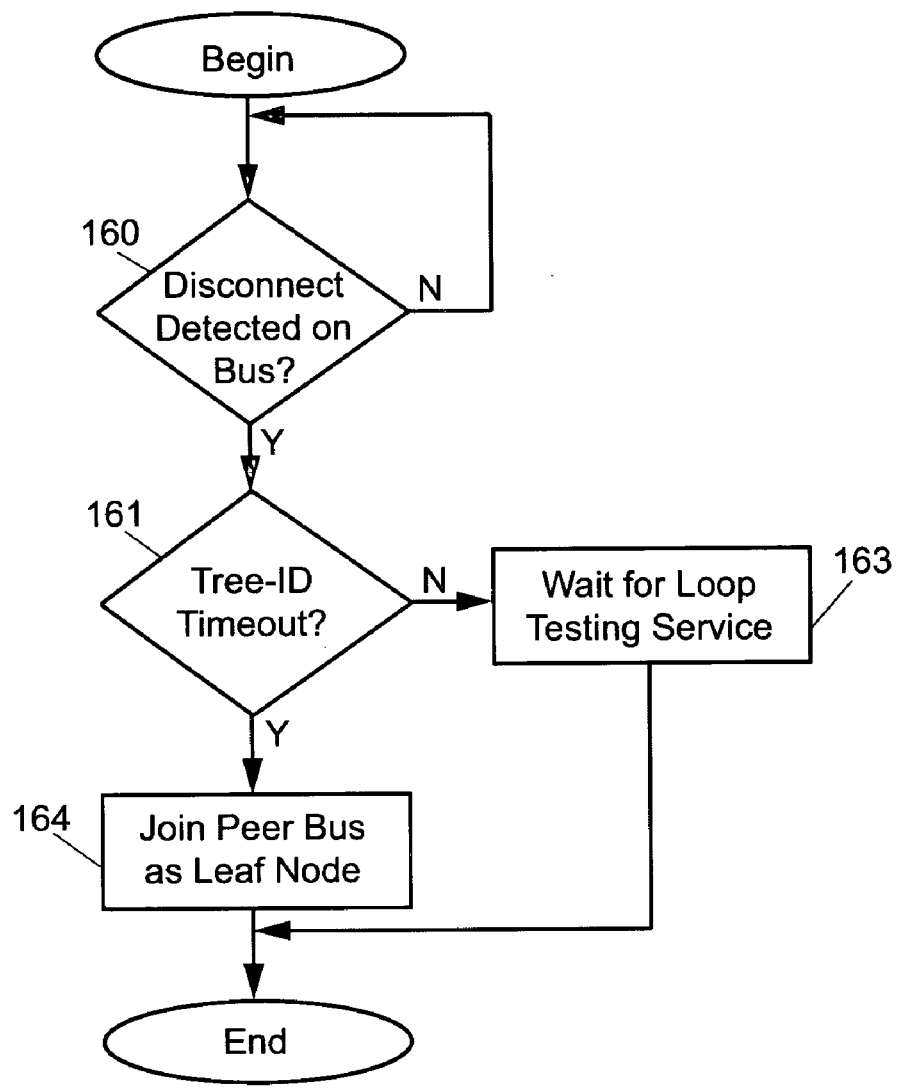
FIG. 11A is a flow diagram that illustrates the "Quarantined" state of a port in accordance with one embodiment of the present invention.
Figure 11B:
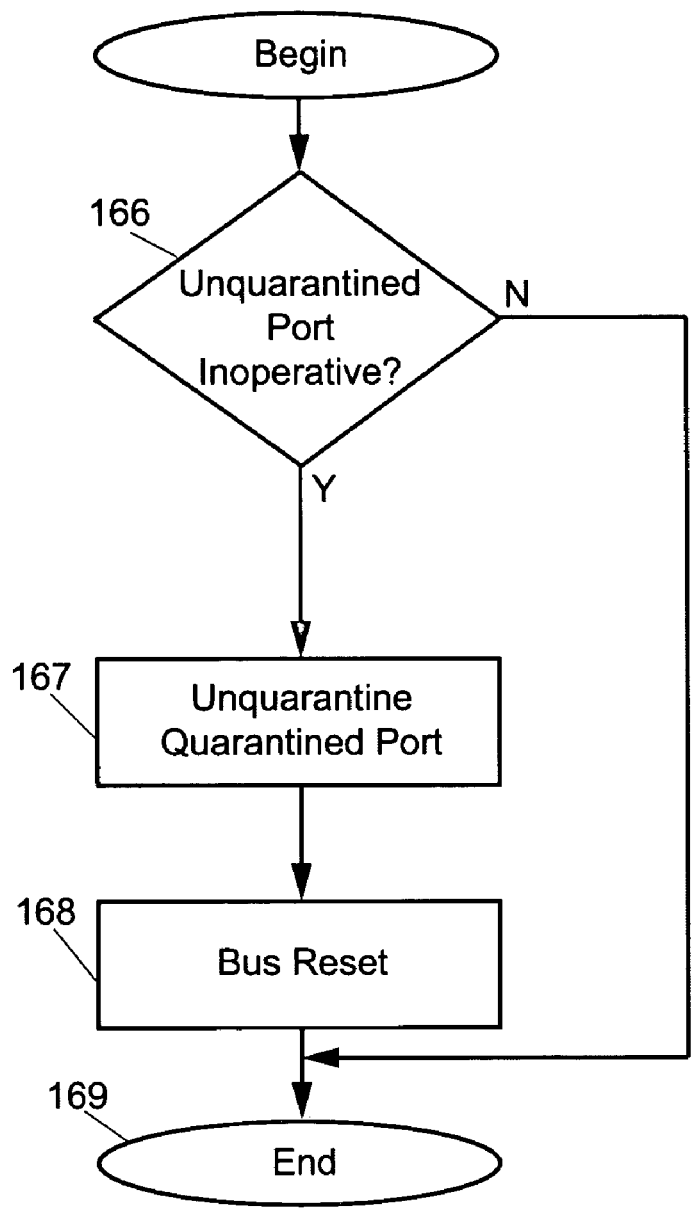
FIG. 11B is a flow diagram that illustrates unquarantining a quarantined port in accordance with one embodiment of the present invention.

Turning now to FIG. 11B, a method for unquarantining a quarantined port in accordance with one embodiment of the present invention is presented. This embodiment addresses the situation where a previously operational port later becomes inoperative. The port may become inoperative, for example, when a device is physically disconnected or put in a suspend state. At reference numeral 166, a check is made to determine whether an unquarantined port has become inoperative. If the port has not become inoperative, execution continues at reference numeral 169. If the port has become inoperative, a quarantined port is unquarantined at reference numeral 167. At reference numeral 168, a bus reset is issued and the bus is reconfigured, thereby allowing bus operation to continue. The loop testing is performed as described above, as it may be that a loop still exists.

Figure 12:
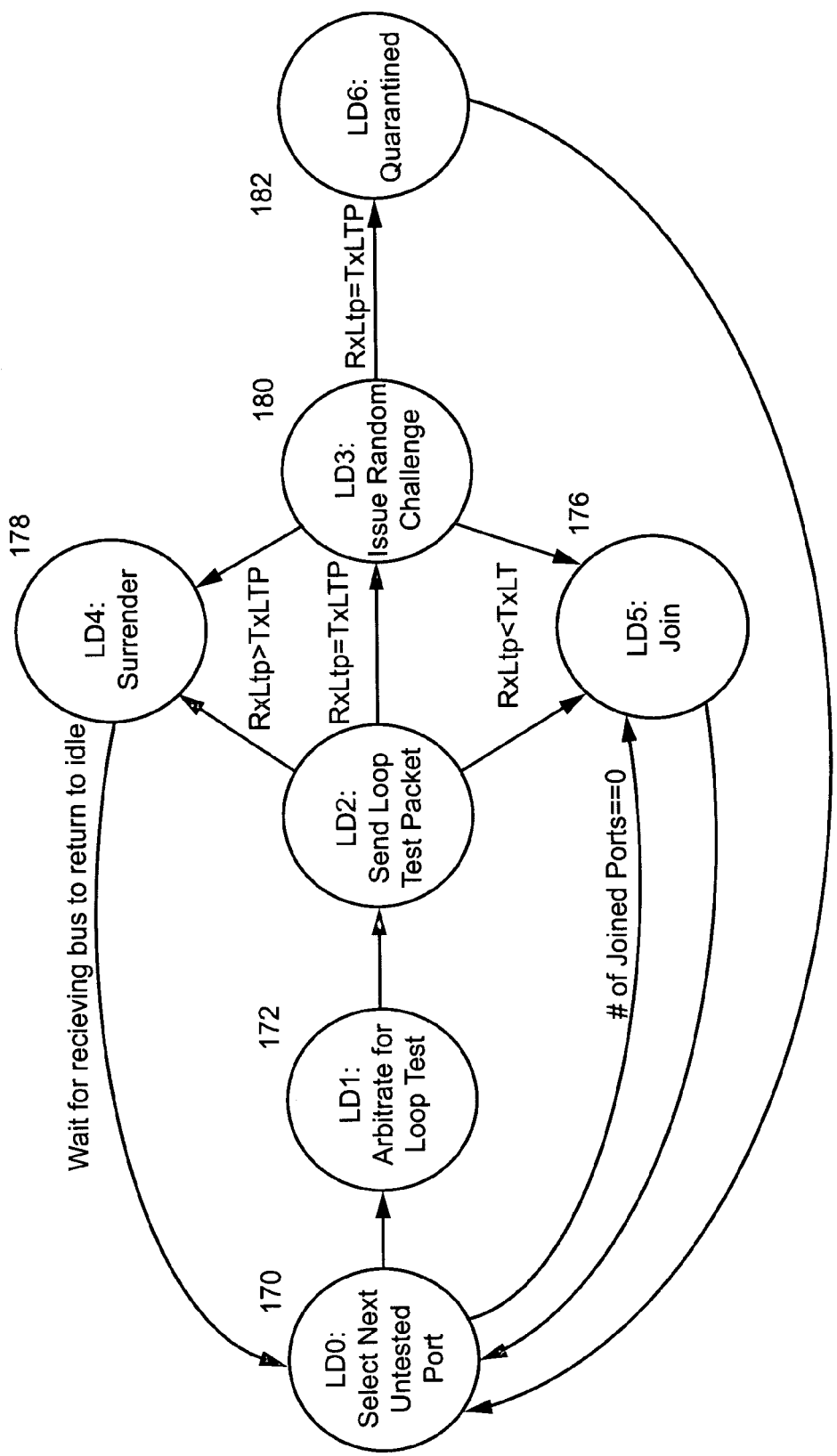
FIG. 12 is a detailed state diagram that illustrates the loop detection sequence in accordance with one embodiment of the present invention.

Turning now to FIG. 12, a detailed state diagram illustrating the loop detection sequence in accordance with one embodiment of the present invention is presented. The illustration of this invention with respect to the IEEE1394A standard is not intended to be limiting in any way. Those of ordinary skill in the art will recognize that the invention may be applied to other buses as well.

"Select Next Untested Port" State

At reference numeral 170, the next untested port is selected. According to a preferred embodiment, ports associated with higher speed connections are chosen before lower speed connections. Those of ordinary skill in the art will recognize that selecting ports in this way increases the likelihood of "removing" the lowest speed cable in the event a loop is detected. While the cable or other physical connection itself is not removed, the loop created by a cable is broken by isolating the particular port involved in the loop.

"Arbitrate for Loop Test" State

At reference numeral 172, the PHY initiates arbitration for one or both of the buses required to perform loop testing. According to one embodiment of the present invention, if both the main and peer buses are multi-node buses, arbitration is initiated simultaneously on both buses and the loop testing is initiated on the first bus to be granted. If one bus is a single node bus and the other is a multi-node bus, arbitration is performed on the multi-node bus first. If both buses are single node buses, arbitration begins on both and loop testing is initiated on the first bus granted. This process of performing arbitration on multiple buses simultaneously reduces the probability of requiring a long bus reset when joining ports to a PHY.

Send Loop Test Packet State

At reference numeral 174, the PHY transmits a loop test packet including a unique identifier. The transmitted identifier is denoted "TxLTP." While transmitting the LTP, the PHY listens for any packet received on the main bus or the peer bus within a period of time. The received identifier is denoted "RxLTP."

According to an embodiment of the present invention, the identifier includes the PHY ID and port ID of the transmitting port, the PHY ID and port ID of the receiving port, the speed of the untested port and a Globally Unique Identifier (GUID). According to another embodiment of the present invention, the identifier includes the PHY ID and port ID of the transmitting port, the PHY ID and port ID of the receiving port, the speed of the untested port and a random number.

The discussion of particular unique identifiers is not intended to be limiting in any way. Those of ordinary skill in the art will recognize there are many other ways of forming unique identifiers. These other ways of forming unique identifiers may include, for example, other combinations of the PHY ID and port ID of the transmitting port, the PHY ID and port ID of the receiving port, the speed of the untested port, a Globally Unique Identifier (GUID) and a random number.

The identifier is used to determine if a particular LTP was sent by the local PHY or by another PHY in the network. Additionally, the identifier prevents two or more PHYs from simultaneously joining ports, thus creating a loop. A loop is avoided by using a predetermined criteria and the unique identifiers from multiple PHYs to establish a "winning" PHY and "losing" PHY(s). Since more than two PHYs could be performing loop testing simultaneously, there could be more than one "losing" PHY. The winning PHY joins the port to the main bus, while the losing PHY(s) surrender the buses. The PHY waits at least a subaction gap (as defined by the IEEE1394A standard) after sending a LTP. If the PHY has either not seen a RxLTP or has received one with a lower ID, a loop does not exist and the port can be safely joined to the main bus.

Join State

At reference numeral 176, the port under test is joined to the main bus. According to a preferred embodiment of the present invention, the port is joined by first waiting a period of time for the PHY to win arbitration of both the main bus and the peer bus. If arbitration of both buses is won within the period of time, a relatively short bus reset is issued. If arbitration of both buses is not won within the period of time, a relatively long bus reset is issued. After the port has been joined, the next untested port is selected and tested for loops.

Surrender State

The surrender state is indicated by reference numeral 178. To prevent both PHYs from joining simultaneously, the PHY with the lower ID surrenders and waits until the receiving bus returns to idle, which may occur after a bus reset used by the winning PHY to join a port. Once the port surrenders the buses, the next untested port is selected and tested for loops.

Issue Random Challenge State

At reference numeral 180, the PHY has received the same identifier as the one transmitted. Consequently, a loop may exist. Alternatively, another PHY may have chosen the same ID. At reference numeral 180, the LTP is modified to include a random number to reduce the risk of a false loop detection in the case where two PHYs use the same initial identifier. The modified packet is sent and the same criteria used in the "Send Loop Test Packet" state 174 is used to determine whether to surrender bus control, or to join the port to the main bus.

Figure 13:
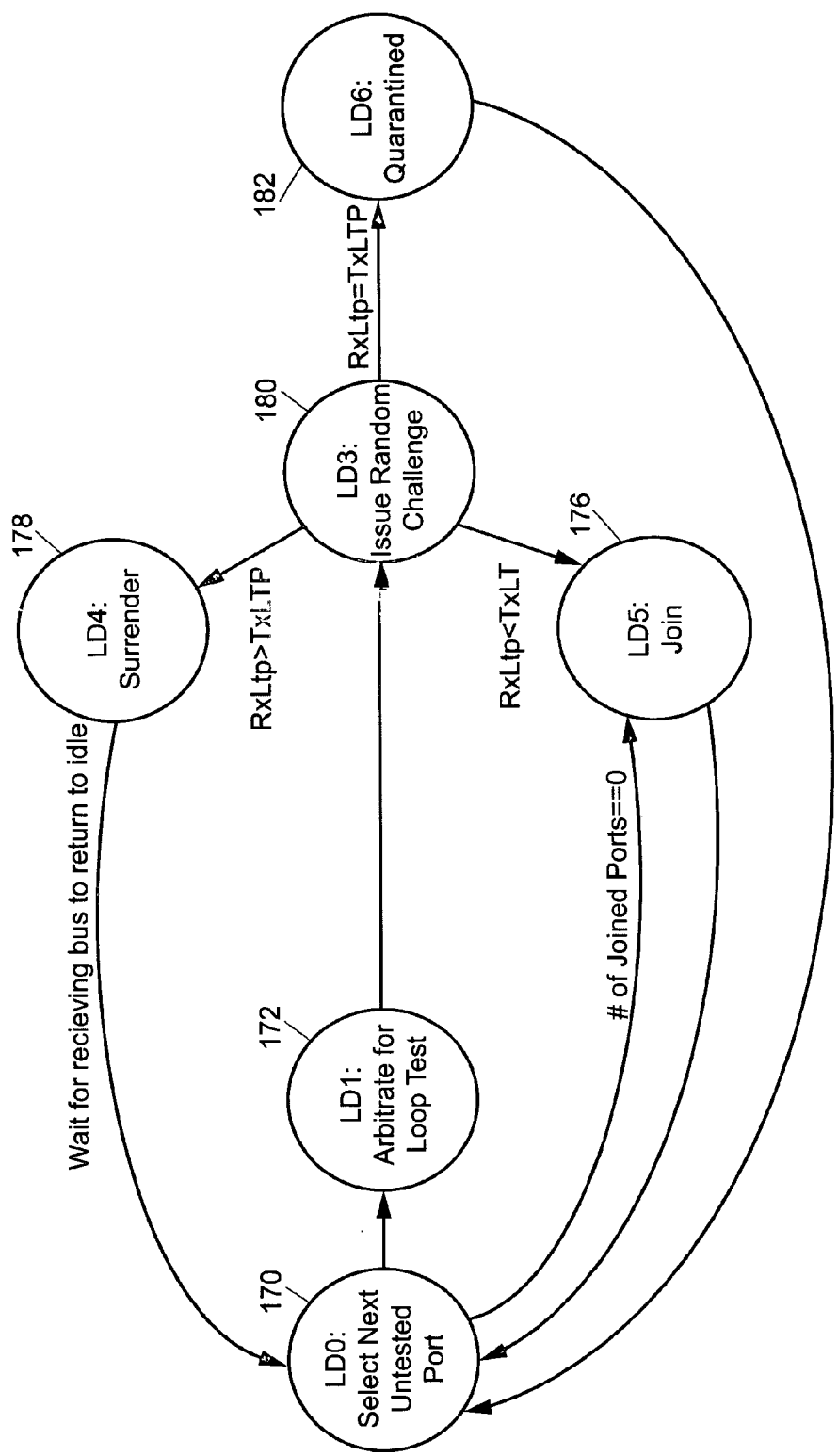
FIG. 13 is a detailed state diagram that illustrates the loop detection sequence in accordance with one embodiment of the present invention.

According to another embodiment of the present invention, the original LTP is modified to include a random challenge, thus requiring only one loop test per port. This embodiment is illustrated in FIG. 13.

Quarantined State

At reference numeral 182, if the PHY received the same identifier as the one it transmitted, a loop exists and the port is quarantined. Once the port is quarantined, the next untested port is selected and tested for loops. This process continues until all ports of the PHY have been tested.

The criteria used to determine what action to take based upon a comparison of a TxLTP and a RxLTP is not intended to be limiting in any way. Those of ordinary skill in the art will recognize that other criteria may be used. For example, a port might be joined if a first criteria is met with respect to the TxLTP and the RxLTP. A port might surrender the buses if a second criteria is met with respect to the TxLTP and the RxLTP. Also, the decision to issue a random challenge or to quarantine the bus may be based on a third criteria with respect to the TxLTP and the RxLTP. This third criteria may include determining whether the packets are equivalent, meaning the same or similar.

To aid in an understanding of the present invention, flow diagram representations of the state diagram in FIG. 12 are now presented. FIGS. 14A-14E further illustrate loop detection in accordance with one embodiment of the present invention.

Figure 14A:
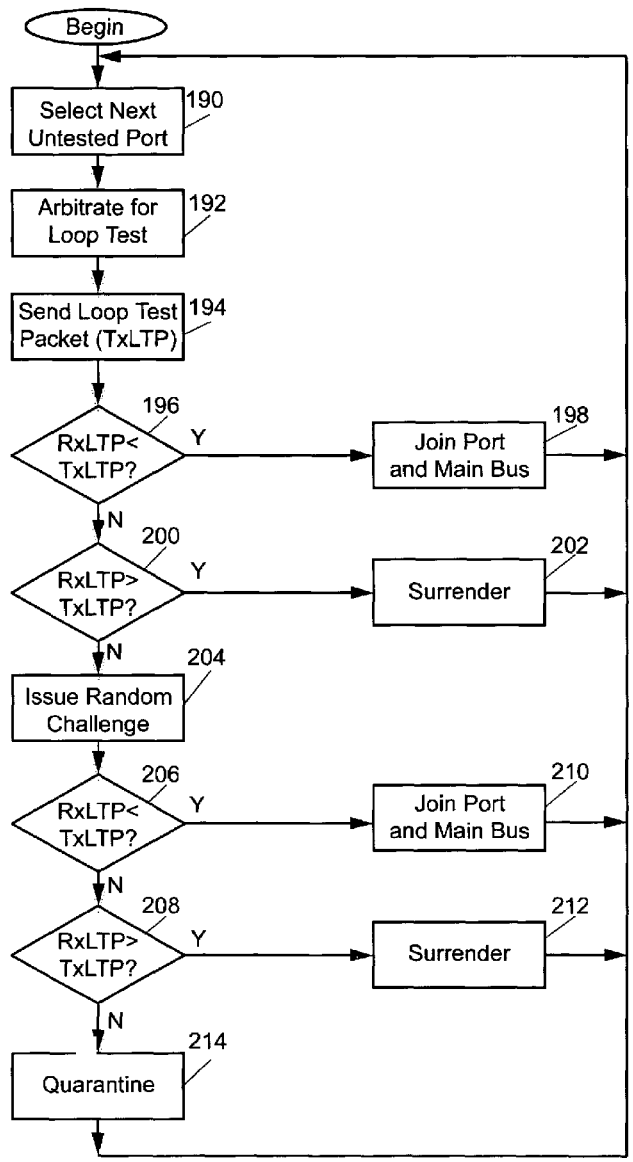
FIG. 14A is a detailed flow diagram that illustrates the loop detection sequence in accordance with one embodiment of the present invention.

Turning now to FIG. 14A, a detailed flow diagram illustrating loop detection in accordance with the present invention is presented. At reference numeral 190, the next untested port is selected. At reference numeral 192, the PHY arbitrates for loop test. At reference numeral 194, a loop test packet containing a unique identifier is sent. At reference numeral 196, the unique identifiers in the TxLTP and the RxLTP are compared. If the unique identifier in the RxLTP is less than the unique identifier in the TxLTP or if the RxLTP is not received within a period of time, the port is joined to the main bus at reference numeral 198 and testing of the next port is initiated at reference numeral 190. If the unique identifier in the RxLTP is greater than or equal to the unique identifier in the TxLTP, the unique identifiers are compared again at reference numeral 200. If the unique identifier in the RxLTP is greater than the unique identifier in the TxLTP, the PHY surrenders control of the buses at reference numeral 202 and testing of the next port is initiated at reference numeral 190.

If the RxLTP is equal to the TxLTP, a random challenge is issued at reference numeral 204. At reference numerals 206 and 208, the RxLTP and the TxLTP are compared as was done at reference numerals 196 and 200. If the unique identifier in the RxLTP is less than the unique identifier in the TxLTP or if the RxLTP was not received within a period of time, the port is joined to the main bus at reference numeral 210 and testing of the next port is initiated at reference numeral 190. If the unique identifier in the RxLTP is greater than the unique identifier in the TxLTP, the PHY surrenders control of the buses at reference numeral, 212 and testing of the next port is initiated at reference numeral 190. If the RxLTP is equal to the TxLTP, the port is quarantined at reference numeral 214 and testing of the next port is initiated at reference numeral 190.

Figure 14B:
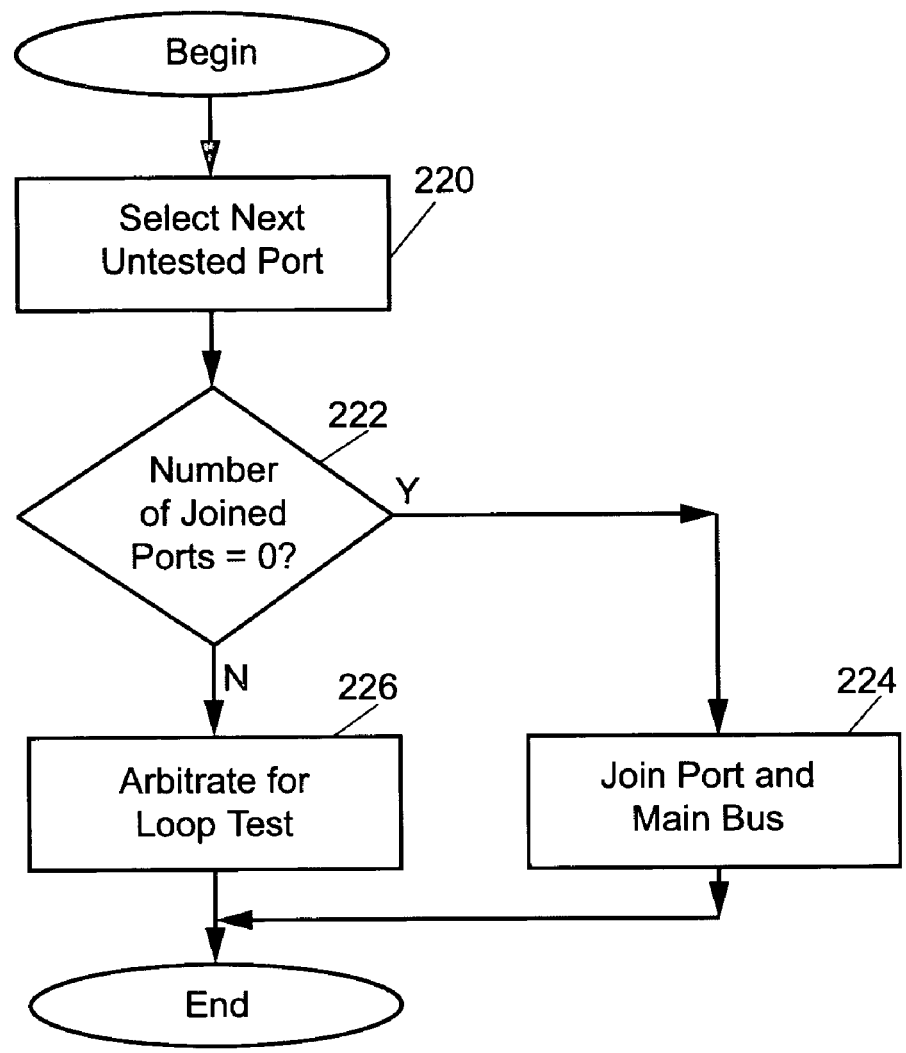
FIG. 14B is a detailed flow diagram that illustrates selecting an untested port in accordance with one embodiment of the present invention.

Referring now to FIG. 14B, a flow diagram illustrating selecting an untested port in accordance with one embodiment of the present invention is presented. At reference numeral 220, an untested port is selected. Since a leaf node cannot be part of a loop, the first connected port of a PHY may bypass loop testing and join the main bus immediately. At reference numeral 222, a check is made to determine whether the number of joined ports is zero. If the number of joined ports is zero, the port and the main bus are joined at reference numeral 224. If the number of joined ports is not zero, arbitration for loop test is performed at reference numeral 226.

Figure 14C:
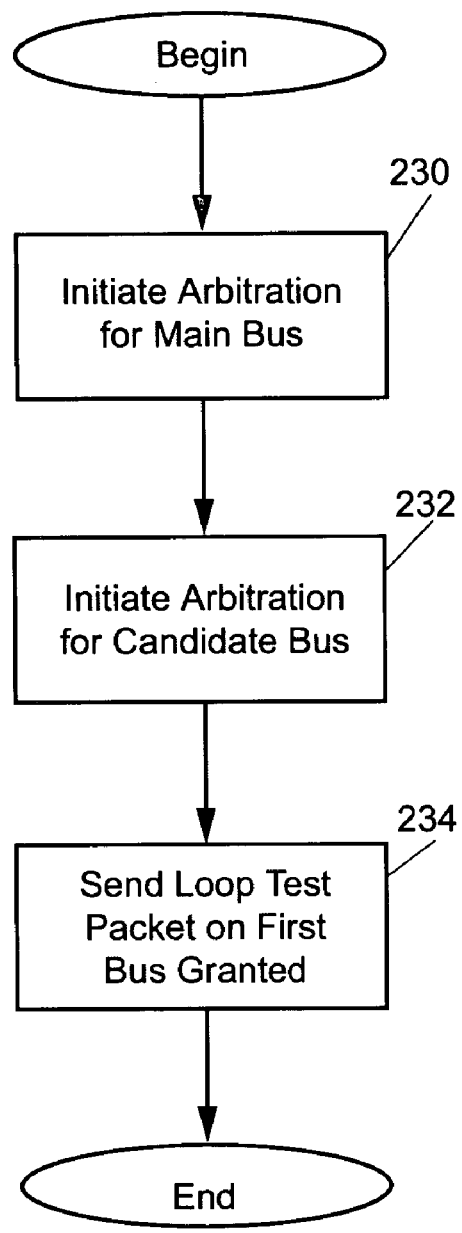
FIG. 14C is a detailed flow diagram that illustrates arbitrating for loop test in accordance with one embodiment of the present invention.

Referring now to FIG. 14C, a flow diagram illustrating arbitrating for loop test in accordance with one embodiment of the present invention is presented. According to one embodiment of the present invention, arbitration for the main bus is initiated at reference numeral 230. As discussed above, arbitration for the main bus is performed to allow a short bus reset for joining the port to the main bus. At reference numeral 232, arbitration for the peer bus is initiated. At reference numeral 234, a loop test packet is sent on whatever bus is granted first. The order of reference numerals 232 and 230 is not important. Arbitration may be initiated for both buses in series, or arbitration may be initiated for both buses in parallel.

Figure 14D:
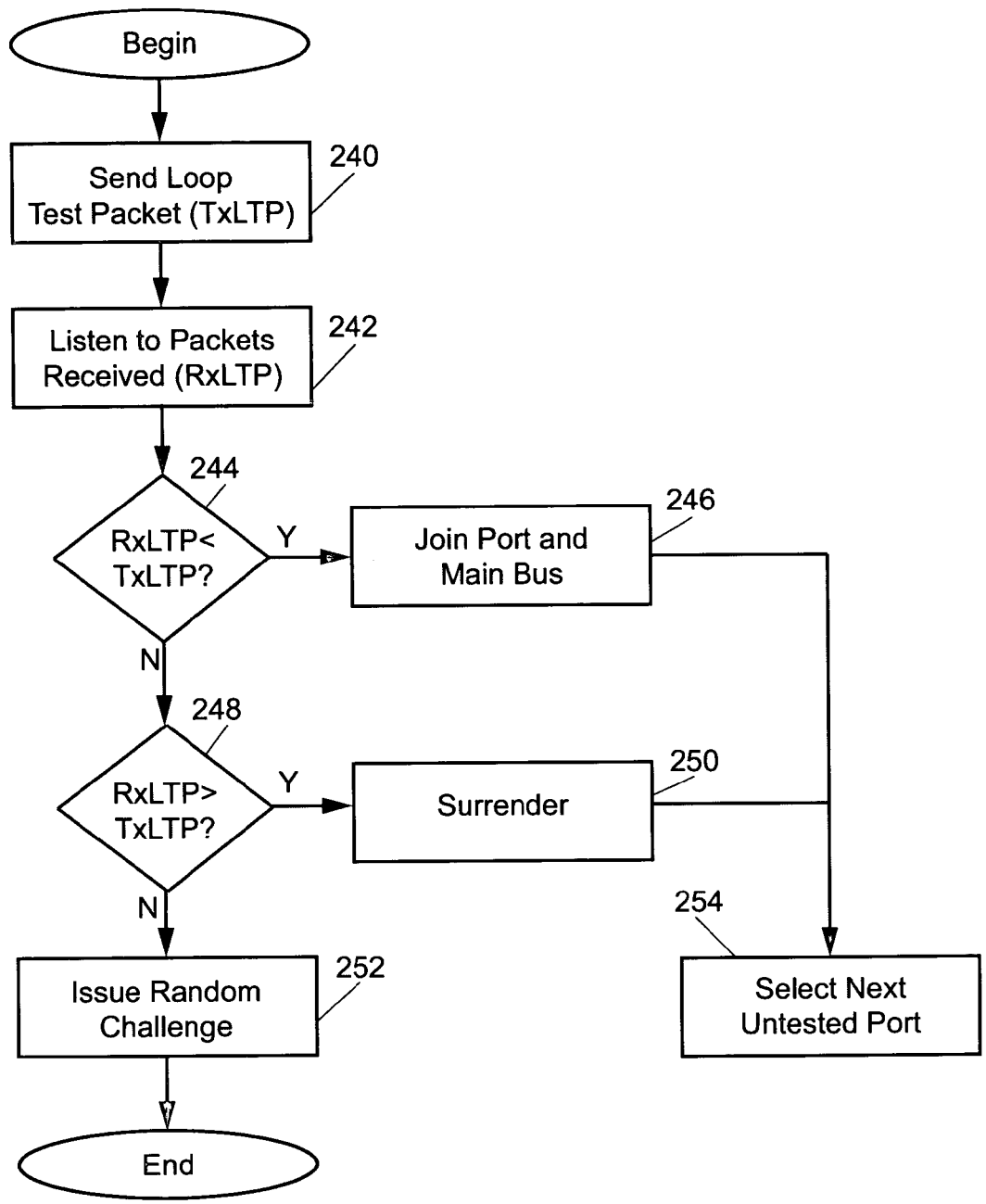
FIG. 14D is a detailed flow diagram that illustrates sending a loop test packet in accordance with one embodiment of the present invention.

Referring now to FIG. 14D, a flow diagram illustrating sending a loop test packet in accordance with one embodiment of the present invention is presented. If arbitration for the main bus was granted first, a loop test packet is sent from a tested port connected to the main bus. If arbitration for the peer bus was granted first, a loop test packet is sent from the port under test, which is connected to the peer bus. To prevent obfuscation of the present invention, the following disclosure will refer to the case in which arbitration on the peer bus is granted first. However, those of ordinary skill in the art will recognize that the embodiments of the present invention disclosed herein may apply to the case in which arbitration for the main bus is granted first, in which case the loop test packet sending and receiving roles of the port under test and an active port are reversed.

At reference numeral 240, a loop test packet is sent on the peer bus. At reference numeral 242, the P14Y listens for packets received by any port connected to the main bus. The packets are compared as discussed with respect to FIG. 14A, above.

Figure 14E:
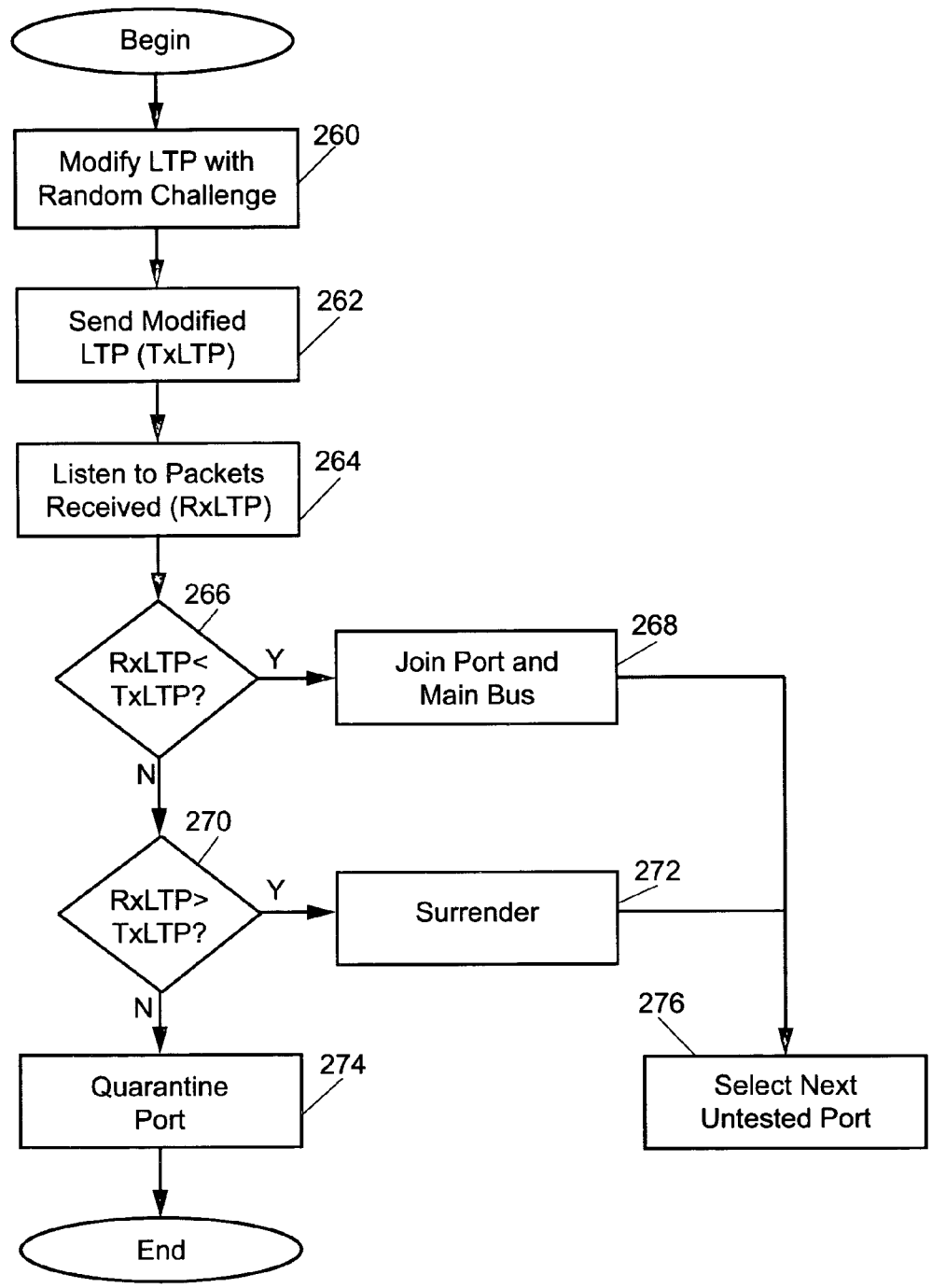
FIG. 14E is a detailed flow diagram that illustrates issuing a random challenge in accordance with one embodiment of the present invention.

Referring now to FIG. 14E, a flow diagram illustrating issuing a random challenge in accordance with one embodiment of the present invention is presented. At reference numeral 260, the loop test packet is modified to include random data. At reference numeral 262, the modified loop test packet is sent on the peer bus. At reference numeral 264, packets received by the port connected to the main bus are monitored. The packets are compared as discussed with respect to FIG. 14A, above. If the packets are equivalent, a loop exists and the port is quarantined at reference numeral 274. The next port is then selected for loop testing. This process continues until all ports have been tested for loops.

Figure 14F:
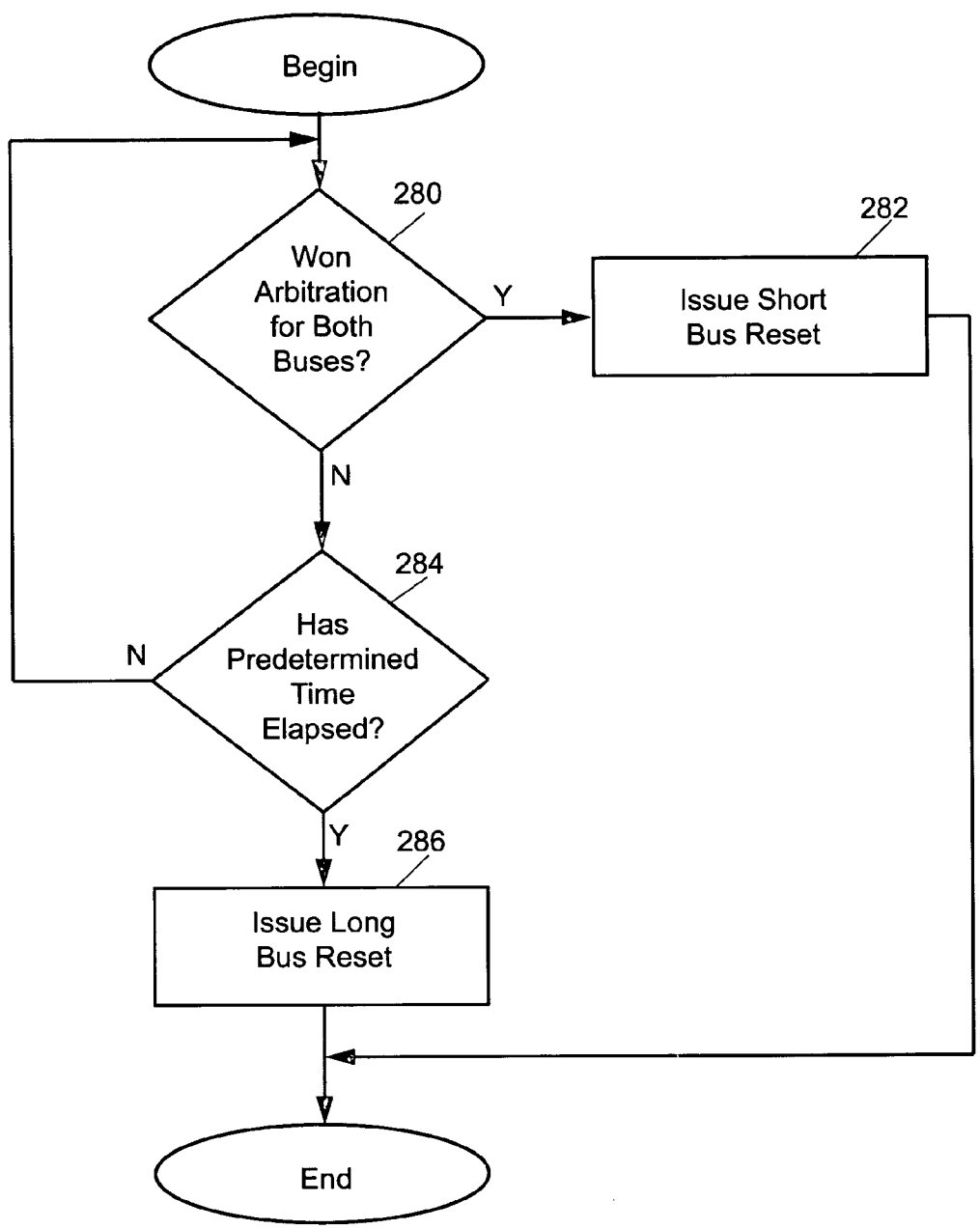
FIG. 14F is a detailed flow diagram that illustrates issuing joining a port to bus in accordance with one embodiment of the present invention.

Referring now to FIG. 14F, a flow diagram illustrating joining a port to the main bus in accordance with one embodiment of the present invention is presented. At reference numeral 280, a check is made to determine whether arbitration for both the main bus and the peer bus has been won. If arbitration for both buses has been won, a relatively short bus reset is issued at reference numeral 282. If arbitration for both buses has not been won, a check is made at reference numeral 284 to determine whether a period of time has elapsed since beginning the Join process. If the period of time has not elapsed, execution continues at reference numeral 280. If the period of time has elapsed, a relatively long bus reset is issued at reference numeral 286.

As discussed above with reference to FIG. 14D, many other embodiments of the present invention are possible when the roles of the sending and receiving ports are reversed. Arbitration for the main bus is granted first. A first port that is active (has been tested, found free of loops and joined to a PHY), sends the loop test packet containing a first unique identifier. A second port that has not been tested and is from the same node as the first port listens for a packet containing a second unique identifier. If a first criteria is met with respect to the first and second identifiers, or if a loop test packet is not received within a period of time, the second port may be joined with the node. If a second criteria is met with respect to the first and second identifiers, the second port is quarantined.

Quarantining Connections Based on Node Count

Figure 15:
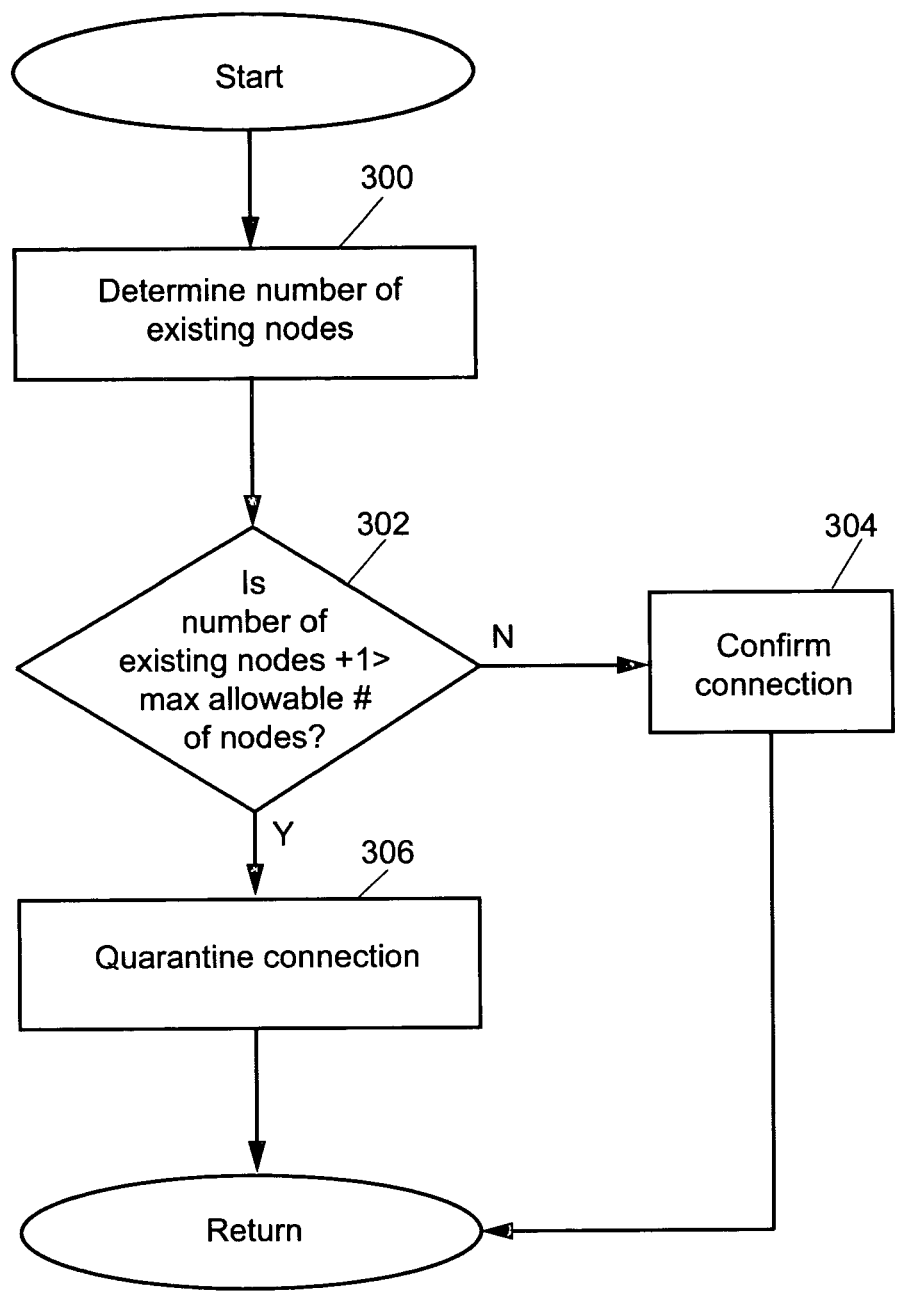
FIG. 15 is a detailed flow diagram that illustrates quarantining connections based on node count in accordance with one embodiment of the present invention.

FIG. 15 illustrates a method of quarantining connections based on node count. The operations in FIG. 15 are performed when a new connection is made to an existing network, typically when someone attempts to attach a new network device to the existing network by connecting an additional cable between the new network device and an existing network device. Beginning at reference numeral 300, a determination of how many nodes exist in the network is made. At reference numeral 302, a comparison is made between the number of existing nodes+1 and the maximum number of nodes allowed on the network. For example, the maximum number of nodes allowed on a network according to the IEEE 1394a standard is 63 (addressed 0-62), and node number 63 is reserved as a universal address for all nodes on the network and to indicate a malconfigured bus.

The number of existing nodes is incremented by one to reflect the number of nodes if the proposed connection is confirmed. If the number of existing nodes+1 is less than the maximum allowable number of nodes, the connection is confirmed at step 304. By confirming the connection, the new device and its connection is added to the network. If the number of existing nodes+1 is not less than the maximum allowable number of nodes, then confirming the connection would result in a configuration of more than the maximum allowable number of nodes. In this case, at reference numeral 306, the connection between the device to be added and an existing node to which the connection is made is quarantined, and the network is preserved. Quarantining a connection based on node count can be performed as illustrated in FIG. 11A and described above. As referred to herein, quarantining a connection involves quarantining each port to which the connection exists. For example, if an attempt to connect a new network device to the network is made that violates the maximum allowable number of nodes, the ports at both ends of the connecting cable are quarantined.

Figure 16:
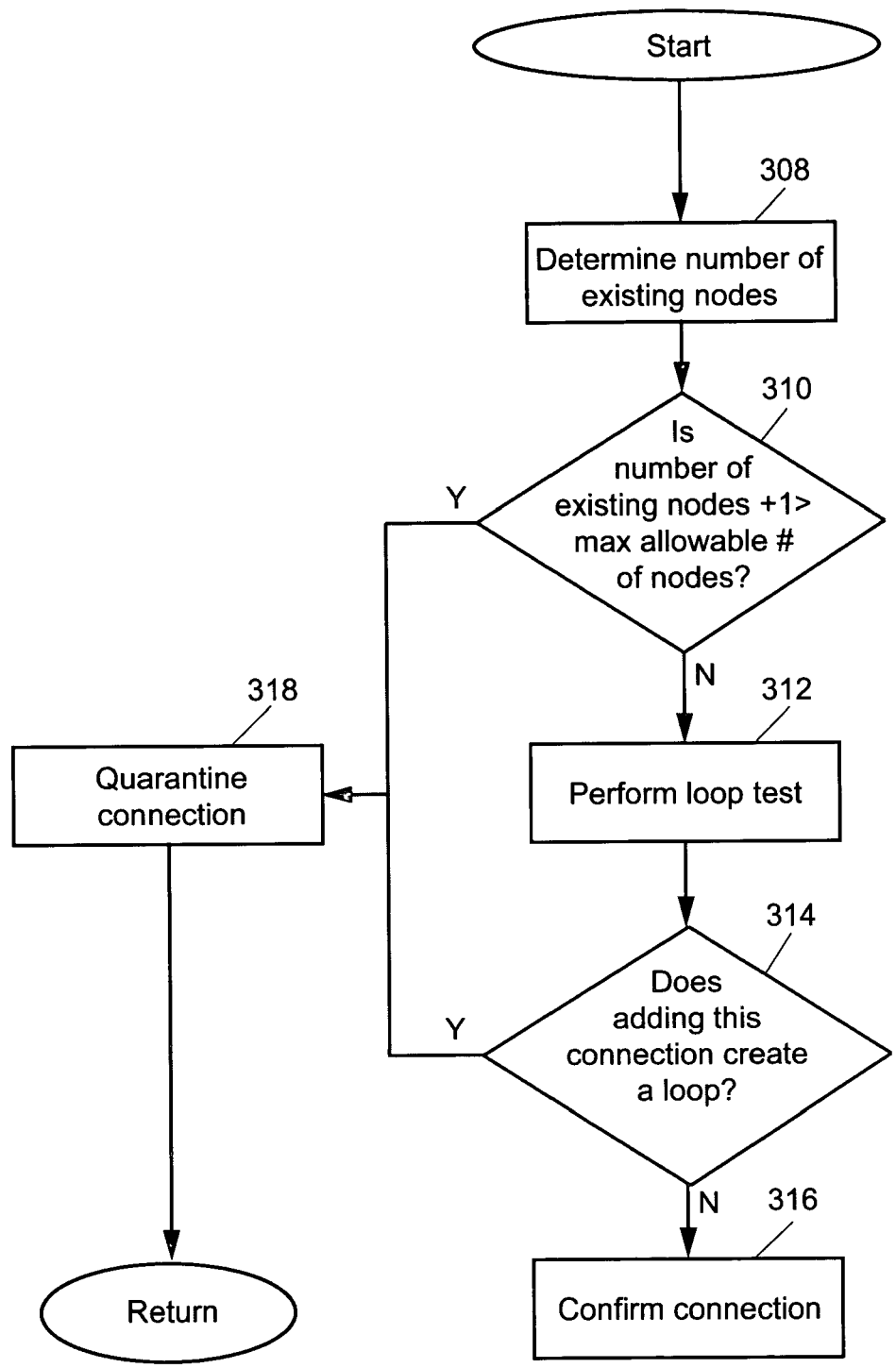
FIG. 16 is a detailed flow diagram that illustrates quarantining connections based on node count and loop testing in accordance with one embodiment of the present invention.

Directing attention to FIG. 16, an alternative embodiment of the present invention is illustrated. As illustrated in FIG. 16, an additional comparison can be made to determine whether adding the connection will create a loop. Beginning at reference numeral 308, a determination of how many nodes exist in the network is made. At reference numeral 310, a comparison is made between the number of existing nodes+1 and the maximum number of nodes allowed on the network. If the number of existing nodes+1 is less than the maximum allowable number of nodes, then control proceeds to reference numeral 312. At reference numeral 312, a loop testing algorithm such as described above is executed on the new connection. At reference numeral 314, a determination is made as to whether the addition of the new connection creates a loop. If the tests at reference numerals 310, 314 both return negative evaluations, the new connection is confirmed at step 316. However, if either the test at reference numeral 310 or the test at reference numeral 314 returns a positive evaluation, control transitions to reference numeral 318, where the connection is quarantined.

According to a presently preferred embodiment, the present invention may be implemented in software or firmware, as well as in programmable gate array devices, Application Specific Integrated Circuits (ASICs), and other hardware.

Alternative Embodiments

Thus, a novel method and apparatus for loop detection on a serial bus has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of configuring a network having a plurality of nodes connected by a bus, the method comprising:
    determining an existing number of member nodes on the network;
    determining whether the existing number of member nodes plus a candidate node is less than a maximum number of nodes allowed in the network; and
    quarantining a connection between the network and the candidate node if adding the candidate node to the network results in a number of nodes that exceeds the maximum number of nodes on the network.

2. The method of claim 1, wherein quarantining comprises deactivating a port on a PHY to which a connection is made.

3. The method of claim 1, further comprising confirming the connection if the candidate node, when added to the existing number of member nodes, does not exceed the maximum number of nodes allowed on the network.

4. The method of claim 1, further comprising performing a loop test on the connection between the network and the candidate node.

5. The method of claim 4, further comprising quarantining the connection between the network and the candidate node if adding the candidate node to the network creates a loop.

6. The method of claim 4, further comprising confirming the connection to the candidate node if adding the candidate node to the network does not create a loop.

7. A computer readable medium comprising instructions, which, when executed by a processor, configure a network having a plurality of nodes connected by a bus, by:
    determining an existing number of member nodes on the network;
    determining whether the existing number of member nodes plus a candidate node is less than a maximum number of nodes allowed in the network, wherein the maximum number of nodes allowed in the network is determined at least in part by the number of links in the network; and
    quarantining a connection between the network and the candidate node if adding the candidate node to the network results in a number of nodes that exceeds the maximum number of nodes on the network.

8. The computer readable medium of claim 7, further comprising instructions, which, when executed by a processor, deactivate a port on a PHY to which a connection is made.

9. The computer readable medium of claim 7, further comprising instructions, which, when executed by a processor, confirm the connection if the candidate node, when added to the existing number of member nodes, does not exceed the maximum number of nodes allowed on the network.

10. The computer readable medium of claim 7, further comprising instructions, which, when executed by a processor, perform a loop test on the connection between the network and the candidate node.

11. The computer readable medium of claim 10, further comprising instructions, which, when executed by a processor, quarantines the connection between the network and the candidate node if adding the candidate node to the network creates a loop.

12. The computer readable medium of claim 7, further comprising instructions, which, when executed by a processor, confirm the connection to the candidate node if adding the candidate node to the network does not create a loop.

13. A system of nodes connected by a bus, comprising functionality for:
    determining an existing number of member nodes on a network;
    determining whether the existing number of member nodes plus a candidate node is less than a maximum number of nodes allowed in the network, wherein the maximum number of nodes allowed in the network is determined at least in part by the number of links in a combined network comprising the network and the candidate node; and
    quarantining a connection between the network and the candidate node if adding the candidate node to the network results in a number of nodes that exceeds the maximum number of nodes on the network.

14. The system of claim 13, wherein the quarantining functionality comprises deactivating a port on a PHY to which a connection is made.

15. The system of claim 13, further comprising functionality for confirming the connection if the candidate node, when added to the existing number of member nodes, does not exceed the maximum number of nodes allowed on the network.

16. The system of claim 13, further comprising functionality for performing a loop test on the connection between the network and the candidate node.

17. The system of claim 16, further comprising functionality for quarantining the connection between the network and the candidate node if adding the candidate node to the network creates a loop.

18. The system of claim 16, further comprising functionality for confirming the connection to the candidate node if adding the candidate node to the network does not create a loop.

19. A method comprising:
    determining an existing number of member nodes on a network;
    comparing the existing number of member nodes plus a candidate node to the number of links that would exist in the network if the candidate node is added to the network; and
    quarantining at least one connection between the network and the candidate node if the existing number of member nodes plus a candidate node is less than or equal to the number of links that would exist in the network if the candidate node is added to the network.

20. The method of claim 19, wherein quarantining comprises deactivating a port on a PHY to which a connection is made.

21. The method of claim 19, further comprising performing a loop test on the connection between the network and the candidate node.

22. The method of claim 19, further comprising quarantining the connection between the network and the candidate node if adding the candidate node to the network creates a loop.

23. The method of claim 19, further comprising confirming the connection to the candidate node if adding the candidate node to the network does not create a loop.

24. A method comprising:
  determining whether adding a candidate node to a network creates one or more loops in said network; and
  quarantining one or more connections between the network and the candidate node if it is determined that adding the candidate node to the network creates one or more loops.

25. The method of claim 24, wherein quarantining comprises deactivating a port on a PHY to which a connection is made.

26. The method of claim 24, further comprising confirming the connection to the candidate node if adding the candidate node to the network does not create a loop.

27. For use in a data network, a method comprising:
  determining a number of existing nodes associated with said network;
  evaluating the number of existing nodes plus a candidate node, and a number of links that would exist in the network if the candidate node is added to the network; and
  quarantining at least one connection between the network and the candidate node if the existing number of nodes plus a candidate node is less than or equal to the number of links.

28. Network apparatus, comprising:
  a first module adapted to determine whether adding a candidate node to a network creates one or more loops in said network; and
  a second module adapted to quarantine one or more connections between the network and the candidate node if it is determined that adding the candidate node to the network creates one or more loops.

29. The apparatus of claim 28, wherein the second module is adapted to quarantine said one or more connections by deactivating a port on a PHY to which a connection is made.

30. The apparatus of claim 28, further comprising a third module adapted to confirm the connection to the candidate node if adding the candidate node to the network does not create a loop.

* * * * *